US012017622B1

(12) United States Patent
Mireles et al.

(10) Patent No.: US 12,017,622 B1
(45) Date of Patent: Jun. 25, 2024

(54) SYSTEMS AND METHODS FOR A BATTERY EXCHANGE SYSTEM

(71) Applicant: Ford Global Technologies, LLC, Dearborn, MI (US)

(72) Inventors: Ricardo Mireles, Dearborn, MI (US); Rodrigo Gallego, CDMX (MX); Daniel Ortega, Monterrey (MX); Emilio Ruiz, Toluca (MX); Jorge M Bustamante R, Naucalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/189,812

(22) Filed: Mar. 24, 2023

(51) Int. Cl.
| | |
|---|---|
| *B60S 5/06* | (2019.01) |
| *B60L 53/30* | (2019.01) |
| *B60L 53/80* | (2019.01) |
| *H01M 50/244* | (2021.01) |
| *H01M 50/249* | (2021.01) |

(52) U.S. Cl.
CPC ............ *B60S 5/06* (2013.01); *B60L 53/30* (2019.02); *B60L 53/80* (2019.02); *H01M 50/244* (2021.01); *H01M 50/249* (2021.01)

(58) Field of Classification Search
CPC ..... H01M 50/244; H01M 50/249; B60S 5/06; B60L 53/30; B60L 53/80
See application file for complete search history.

(56) References Cited

U.S. PATENT DOCUMENTS

2014/0250653 A1* 9/2014 Droste ................. H01M 10/44
29/729

FOREIGN PATENT DOCUMENTS

| EP | 3715196 A1 | 9/2020 |
| TW | I732052 B | 7/2021 |
| WO | 2021237887 A1 | 12/2021 |

OTHER PUBLICATIONS

"NIO's Newest Generation Power Swap Station 2.0," YouTube Website, Available Online at https://www.youtube.com/watch?v=aBdQQxgxDrY, Apr. 28, 2021, 2 pages.
(Continued)

*Primary Examiner* — Moshe Wilensky
(74) *Attorney, Agent, or Firm* — David Kelley; McCoy Russell LLP

(57) ABSTRACT

Methods and systems are provided for a battery exchange station for an electric vehicle. In one example, a battery exchange station may include a vehicle platform including one or more lifters, a first storage rack positioned on a first side of the vehicle platform, and a second storage rack positioned on an opposing, second side of the vehicle platform. The first storage rack and the second storage rack may store a plurality of batteries. The battery exchange station may include a battery exchange mechanism comprising a dual component battery chamber, a first mobile table, and a second mobile table, the dual component battery chamber comprising stationary component fixed to the electric vehicle and a mobile component slideably coupled to the stationary component, wherein the mobile component is released from the stationary component when the electric vehicle is directly on the vehicle platform and lifted via the one or more lifters.

15 Claims, 10 Drawing Sheets

(56) References Cited

OTHER PUBLICATIONS

Venkateswaran, V. et al., "A Perspective on Battery Swapping as a Viable Alternative to Accelerate EV Adoption in India," Proceedings of the 10th SAE India International Mobility Conference, Oct. 12, 2022, Hilton Bengaluru Embassy Manyata Business Park, 2 pages.

* cited by examiner

SYSTEMS AND METHODS FOR A BATTERY EXCHANGE SYSTEM

FIELD

The present description relates generally to systems and methods for a battery exchange system for a battery electric vehicle.

BACKGROUND/SUMMARY

Electric vehicles are driven using one or more electric machines instead of, or in addition to, an internal combustion engine. Fully electric vehicles include battery electric vehicles (BEV) with an energy storage device such as a battery containing multiple battery cells that store electrical power for powering the electric machine.

Two approaches for charging a BEV are currently available. The first and most common approach includes coupling the BEV to an electricity source for a duration during which the battery positioned therein is charged. Vehicle charging is a time consuming process; however, advances have been made to reduce the time to charge. For example, some BEV chargers report rates of 200 miles in 15 minutes. More commonly, residential electrical sources, such as a 120-volt AC outlet, may take substantially longer (e.g., many hours) to recharge a vehicle battery. The comparably longer duration to charge a vehicle battery versus to fill a gas tank may be viewed by some drivers as a nuisance and may be a disincentive for BEV adoption in the vehicle market.

The second approach, sometimes referred to as battery swapping or exchanging, includes removing the low charge battery from the BEV and replacing it with a fully charged battery. One example of this approach is shown by Ding et al. in EP3715196A1. Therein, an automatic battery swap platform for a BEV is provided including a platform for positioning the vehicle for battery replacement, a tightening gun for uninstalling and installing the vehicle battery, and a conveyor mechanism for transporting discharged and charged batteries between the platform and a battery exchange assembly. This and similar approaches may substantially reduce wait time by drivers compared to vehicle charging.

However, the inventors herein have recognized potential issues with such systems. For example, battery swapping systems frequently include complicated mechanisms and redundant operations. As one example, the aforementioned system is configured for transporting the low charge battery to the battery exchange assembly and for transporting a fully charged battery from the battery exchange assembly via the same conveyor mechanism. As such, the fully charged battery may not be loaded for conveying until the low charge battery is unloaded. As another example, the battery exchange assembly accepts the low charge battery from the conveyor at a first vertical position and dispenses the fully charged battery to the conveyor at a second vertical positon. Conveying and unloading the low charge battery, changing the vertical position of the battery exchange assembly, and loading and conveying the fully charged battery occur as separate, non-overlapping processes that are included in the total time the vehicle is on the platform, and consequentially, increase wait time by drivers.

In one example, the issues described above may be addressed by a battery exchange station for an electric vehicle, comprising: a vehicle platform including one or more lifters; a first storage rack positioned on a first side of the vehicle platform and a second storage rack positioned on an opposing, second side of the vehicle platform, the first storage rack and the second storage rack storing a plurality of batteries; and a battery exchange mechanism comprising a dual component battery chamber, a first mobile table, and a second mobile table, the dual component battery chamber including a stationary component fixed to the electric vehicle and a mobile component slideably coupled to the stationary component, wherein the mobile component is released from the stationary component when the electric vehicle is directly on the vehicle platform and lifted via the one or more lifters. In this way, redundant operations are reduced.

In one example, the mobile component partially encloses a first battery and the first mobile table positions a second battery adjacent to the mobile component. The mobile component may be lowered from the stationary component into alignment with the first mobile table and the second mobile table, wherein a base of the mobile component is approximately level with a first upper surface of the first mobile table and with a second upper surface of the second mobile table. In one example, the alignment forms a conveyor surface from the first mobile table through the open sides of the mobile component to the second mobile table. The first mobile table and the second mobile table may include a plurality of rollers. The plurality of rollers may be operated to slide the first battery into the mobile component at the same time the second battery is unloaded onto the first mobile table. In this way, a total time to exchange a battery is reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a battery exchange station. The battery exchange station may be an example of a system for removing a low charge battery from battery electric vehicle (BEV) and replacing it with a fully charged battery. The battery exchange station is configured to enable battery exchanging with reduced operations while the BEV is on the vehicle platform, thereby reducing the overall driver wait time.

Figure 1:
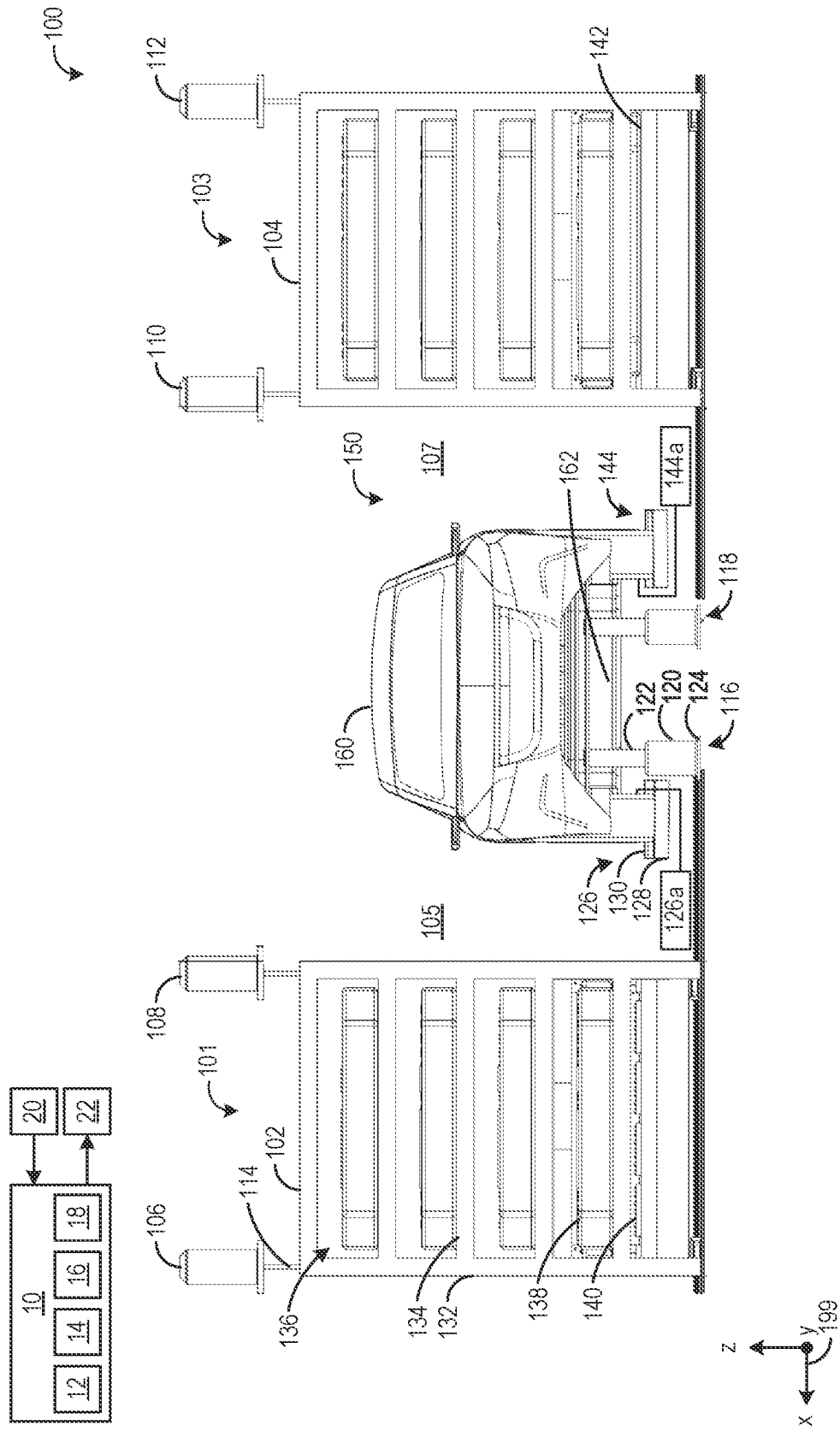
FIG. 1 shows a front view of an example of a battery exchange station.
Figure 2:
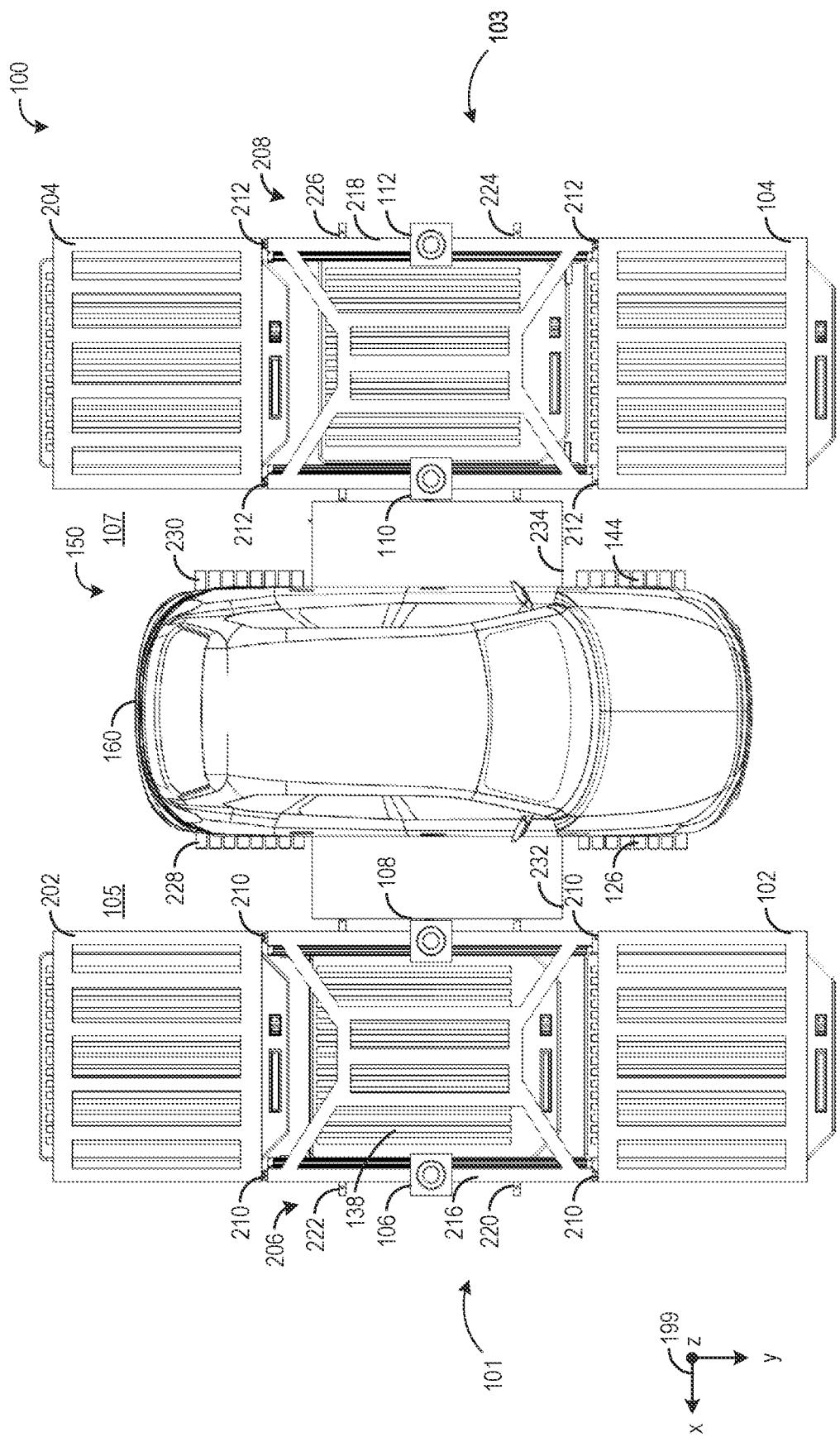
FIG. 2 shows a top view of the battery exchange station illustrated in FIG. 1.
Figure 3:
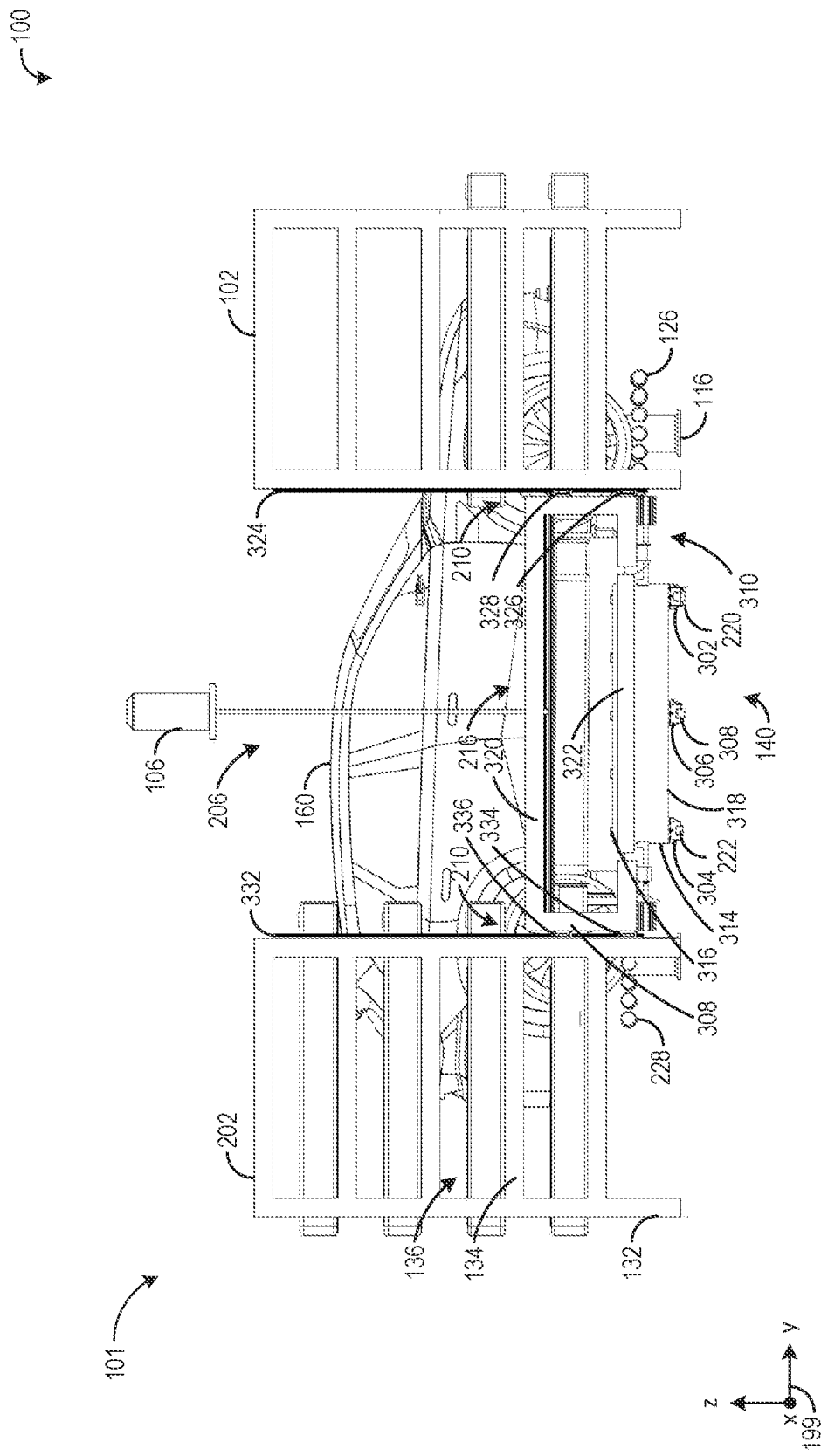
FIG. 3 shows a side view of the battery exchange station illustrated in FIG. 1.
Figure 4:
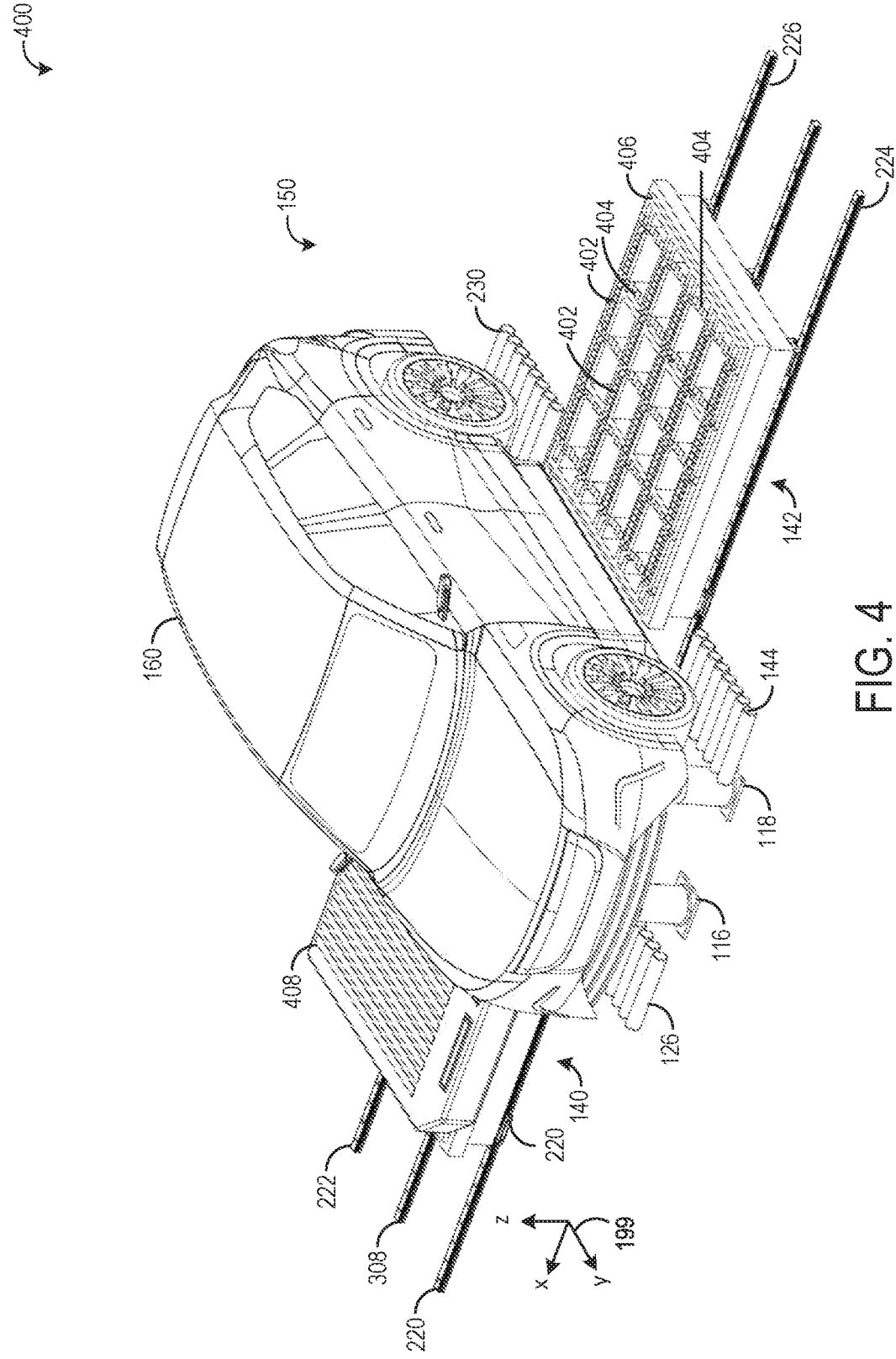
FIG. 4 shows a perspective view of a portion of the battery exchange station illustrated in FIG. 1 including a vehicle in position to exchange a battery.
Figure 5:
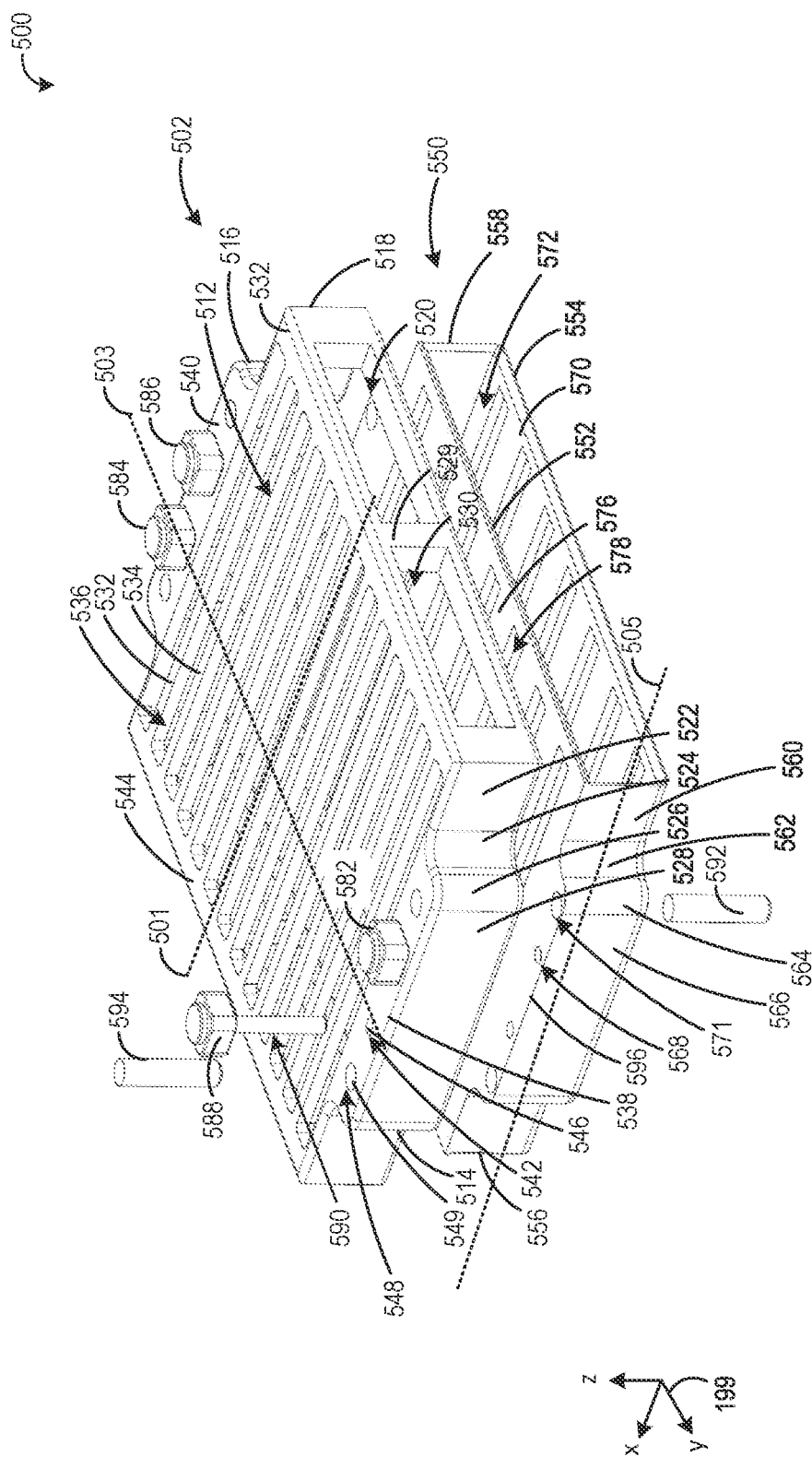
FIG. 5 shows an example of a dual component battery chamber for a battery exchange station.
Figure 6A:
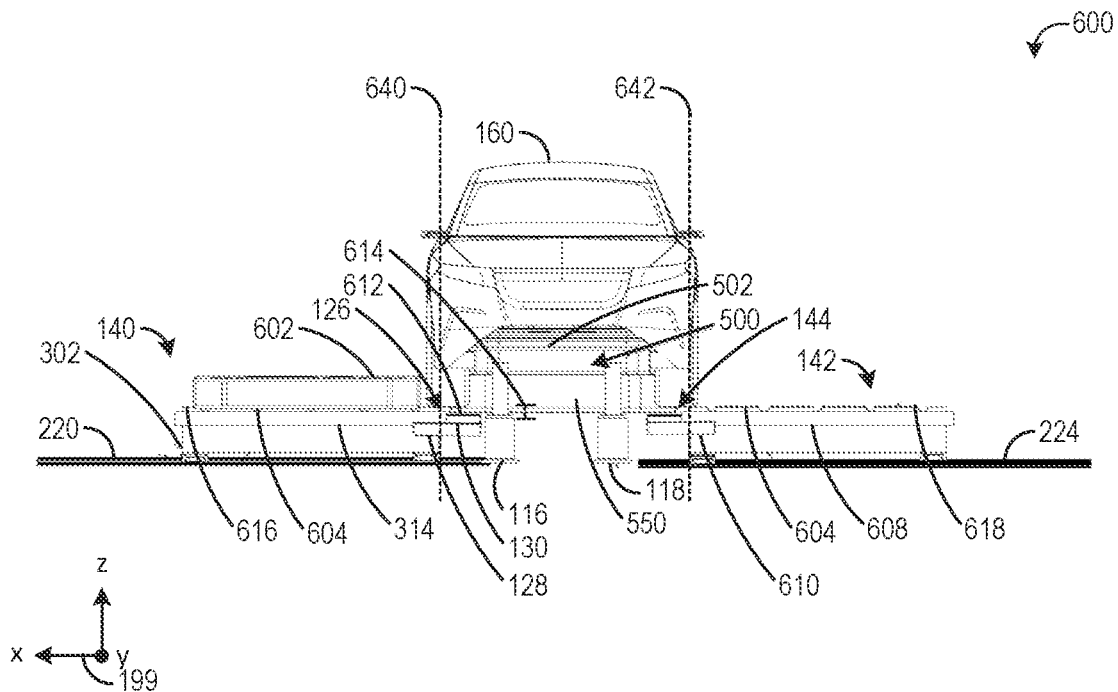
FIG. 6A shows a first operation of a battery exchange process.
Figure 6B:
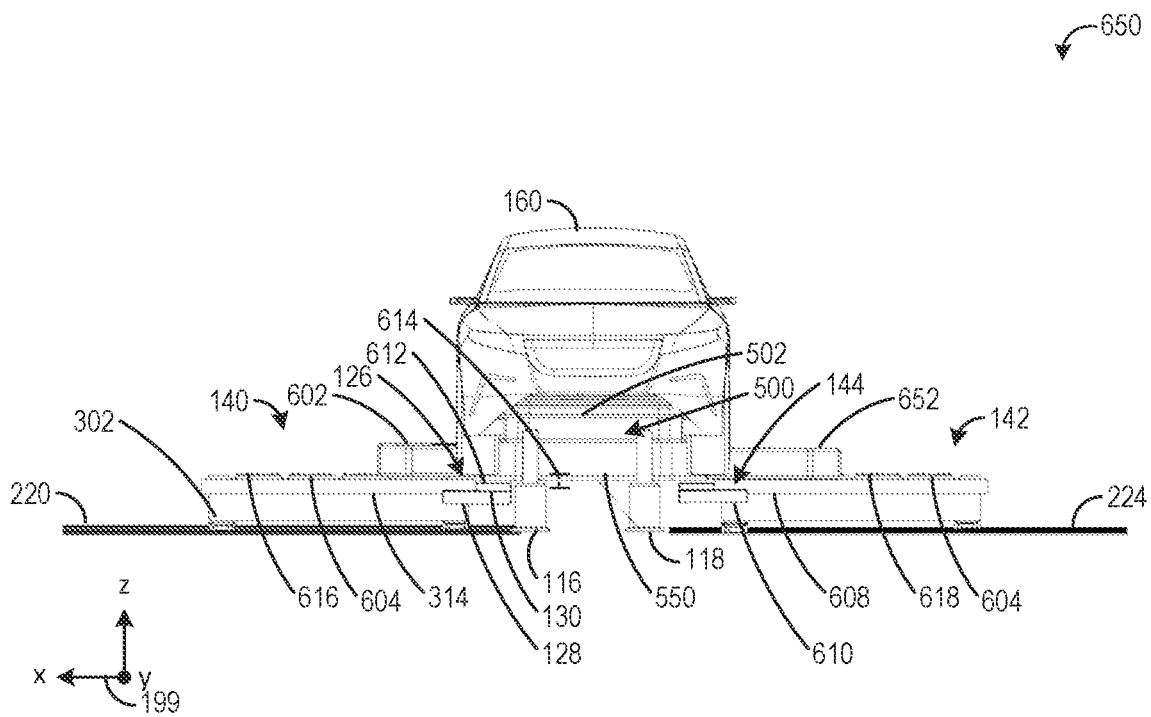
FIG. 6B shows a second operation of the battery exchange process illustrated in FIG. 6A.
Figure 7:
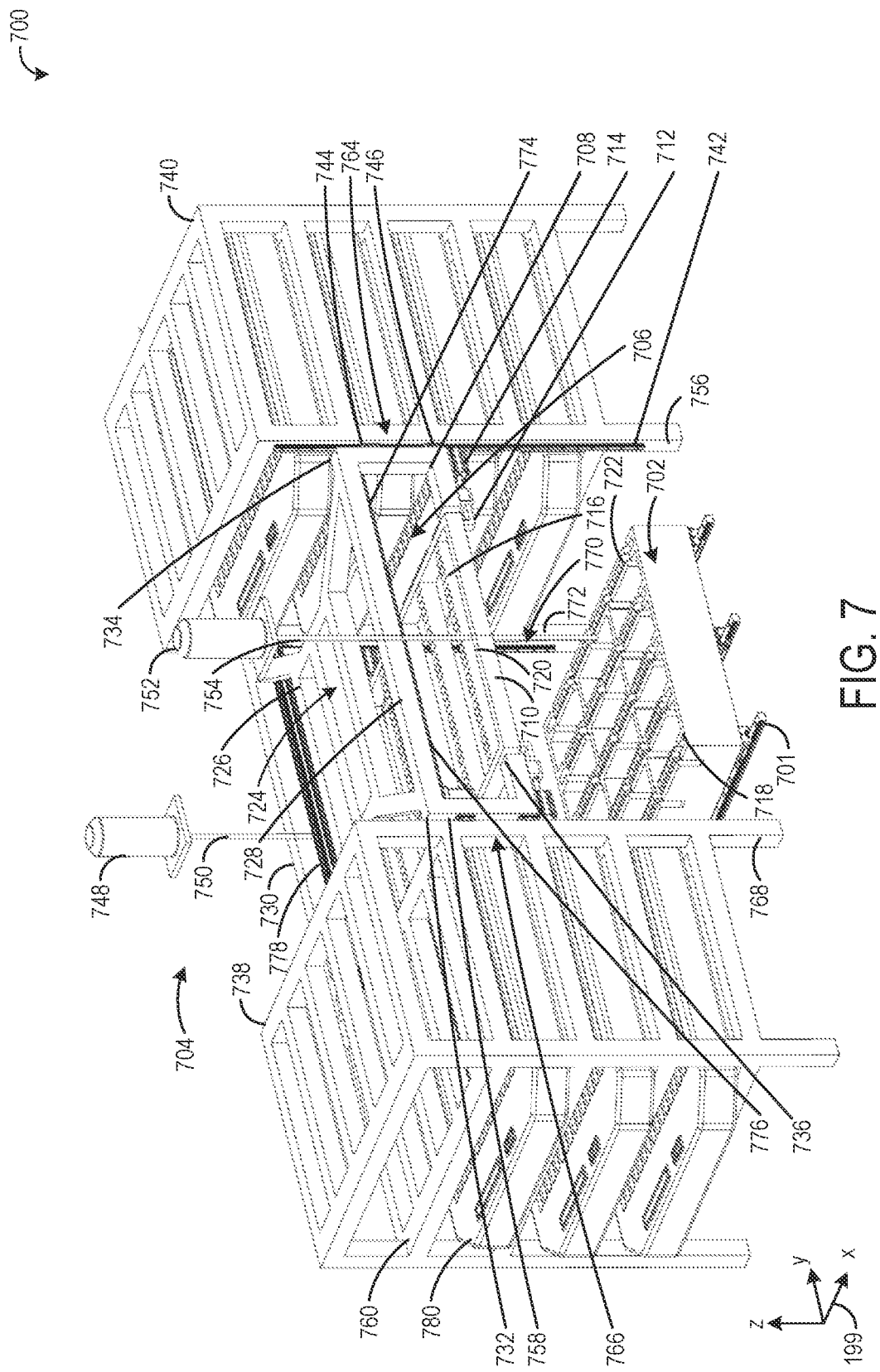
FIG. 7 shows a detail view of a battery charging station.

An example of a battery exchange station for an electric vehicle is shown in FIG. 1. The battery exchange station illustrated with reference to FIG. 1 shows a vehicle platform with a first storage rack arranged opposite from a second storage rack, and a vehicle lifted via first and second vehicle lifters. A top view of the battery exchange station is shown in FIG. 2 including lifting mechanisms for positioning one or more batteries in the first and second storage rack. FIG. 3 shows a side view of the battery exchange station including an example of a mobile table for conveying one or more batteries between the storage rack and the vehicle. A perspective view of a portion of the battery exchange station including a vehicle in position to exchange a battery is shown in FIG. 4. An example of a dual component battery chamber that may be included in a battery exchange mechanism for a battery exchange station is shown in FIG. 5. The dual component battery chamber may comprise stationary component fixed to a vehicle and a mobile component that interfaces with the battery exchange station to unload a low charge or discharged battery (hereafter an empty battery) and load a charged battery (hereafter a full battery). FIG. 6A shows a first operation of a battery exchange station. The first operation may include in response to detecting a vehicle in position, decoupling the mobile component from the stationary component of the dual component battery chamber. FIG. 6B shows a second operation of the battery exchange station illustrated in FIG. 6A. The second operation may include unloading the empty battery while simultaneously the full battery is loaded into the mobile component. With the full battery loaded, the mobile component may be raised and joined to the stationary component of the dual component battery chamber. FIG. 7 shows an example of a battery charging rack for a battery exchange station. Example methods for a battery exchange station are illustrated with reference to FIGS. 8-10.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 1-7 are shown approximately to scale.

An axis system 199 is shown in FIG. 1 and in following figures for reference. The axis system 199 indicates a y-axis, an x-axis, and a z-axis. In one example, the z-axis may be parallel with a direction of gravity, and the x-y plane may be parallel with a horizontal plane that the vehicle may rest on. A filled circle represents an arrow and an axis facing toward, or positive to, a view. An unfilled circle represents an arrow and an axis facing away from, or negative to, a view.

FIG. 1 shows a front view of an example of a battery exchange station 100. The battery exchange station 100 may include a vehicle platform 150, a first storage rack 101 positioned on a first side 105 of the vehicle platform 150, a second storage rack 103 positioned on an opposing, second side 107 of the vehicle platform 150, and a battery exchange mechanism comprising a dual component battery chamber (hereafter a battery chamber) 162, a first mobile table 140, and a second mobile table 142.

The vehicle platform 150 may include one or more lifters for adjusting a vertical position of a vehicle in position to exchange a battery. A first vehicle lifter 116 and a second vehicle lifter 118 are shown engaging with a vehicle 160. The lifters may include a base 120, a post 122 that selectively retracts into the base 120, and a plate 124. In one example, the lifters may be fastened to the vehicle platform 150 via bolts inserted via the plate 124. In one example, the lifters may be operated automatically by a programmable logic controller or PLC (e.g., see controller 10 described below). The PLC may be programmed to activate the lifters once the vehicle 160 is in position. The lifters may have magnetic commercial sensors that detect a position of the post 122 (e.g., up or down). The vehicle platform 150 may also have laser sensors that detect when the vehicle 160 is in position, e.g., a correct position, to be lifted. The post 122 may include a latch or other locking device that secures the lifter to a portion of the vehicle 160. For example, the post 122 may latch to the battery chamber 162 positioned in the vehicle 160. The battery chamber 162 is described in more detail below (e.g., see FIG. 4).

The vehicle platform 150 may include a plurality of roller deck assemblies for adjusting a lateral position of a vehicle (e.g., along the y-axis). In one example, the vehicle platform 150 may include four roller deck assemblies, each aligning with a wheel corner of a vehicle. For example, a first roller deck assembly 126 may be positioned to align relative to a front right wheel corner of a vehicle. The first roller deck assembly 126 may include a rigid frame 128, a plurality of rollers 130 rotatably coupled to the rigid frame 128, and an electric motor having a brake and a gearbox. A second roller deck assembly 144 (e.g., comprised similarly to the first roller deck assembly 126) may be positioned to align relative to a front left wheel corner. In one example, alignment of the vehicle 160 with the battery exchange mechanism on the vehicle platform 150 is controlled by rails (described below) and one or more roller deck servomotors contacting an internal face of a tire of the vehicle 160. Roller deck servomotors 126a, 144a are shown schematically. Roller deck servomotors, including roller deck servomotors 126a, 144a, are attached to the roller deck assemblies (e.g., first roller deck assembly 126, second roller deck assembly 144, and third roller deck assembly 228 and fourth roller deck assembly 230 in FIG. 2) aligning the vehicle 160 when a laser beam sensor (described below) aligns the battery chamber 162 with the stationary component (see FIG. 5) and the second roller deck assembly 144, this enables further processes. Each storage rack may comprise one or more frames and a lifting mechanism (see FIG. 2).

For example, the first storage rack 101 comprises a first frame 102 and a second frame 202 (see FIG. 2) and the second storage rack 103 comprises a third frame 104 and a fourth frame 204 (see FIG. 2). Each frame may include a plurality of legs 132 supporting a plurality of shelves 134. Each frame may include a plurality of battery storage spaces 136 interposed between each shelf of the plurality of shelves 134. In one example, the battery storage spaces 136 include open sides arranged in parallel with an xz plane that facilitate horizontal translation of the batteries, e.g., along the y axis. The open sides enable the plurality of batteries to slide between the battery storage spaces 136 via the lifting mechanism (described in more detail below).

A plurality of batteries 138 may be stored in the first storage rack 101 and in the second storage rack 103. In one example, the first storage rack 101 may be a rack for storing one or more full batteries and the second storage rack 103 may be a rack for charging one or more empty batteries.

Batteries may be loaded and unloaded from a storage rack via the lifting mechanism. The lifting mechanism may comprise a lift platform (see FIG. 2) that may be vertically translatable via operating a pair of servomotors coupled thereto. For example, a first servomotor 106 and a second servomotor 108 may control a vertical translation of the lift platform included in the first storage rack 101. Similarly, a third servomotor 110 and a fourth servomotor 112 may control the lift platform included in the second storage rack 103. Each servomotor controls a spindle 114 coupled to the servomotor and the lift platform. Current to each servomotor may be adjusted to rotate the spindle 114. The lift platform may raise or lower in response to the rotation of the spindle 114.

The battery exchange station 100 may further include a plurality of mobile tables for conveying the plurality of batteries 138 between the vehicle platform 150 and the storage racks. In one example, a first mobile table 140 may convey a full battery to the vehicle platform 150 from the first storage rack 101. A second mobile table 142 may convey an empty battery from the vehicle platform 150 to the second storage rack 103.

FIG. 1 shows schematically a controller 10 that may be included in the battery exchange station 100. The controller 10 receives signals from various sensors positioned in the battery exchange station 100 and employs the various actuators of the battery exchange station 100 to adjust system operation based on the received signals and instructions stored in non-transitory memory of the controller 10. Specifically, controller 10 is shown in FIG. 1 including: microprocessor unit 12, a memory 14 (e.g., including ROM, RAM, and KAM), one or more I/O devices 16, and a data bus 18. The memory 14 may include non-transitory memory for computer readable instructions such as control routines for operating the battery exchange station 100.

The controller 10 is configured to receive various signals from sensors 20 coupled to the battery exchange station 100 and to send command signals to actuators 22 in components in the station, such as the first servomotor 106, the second servomotor 108, the first roller deck assembly 126, the second roller deck assembly 144, and so on. In a few non-limiting examples, one or more of the sensors 20 may include one or more wheel position sensors, one or more magnetic sensors for detecting a position of the lifters (e.g., first vehicle lifter 116, second vehicle lifter 118, etc.), one or more laser sensors for detecting a position of the vehicle 160, and so on. For example, the controller 10 may receive a signal indicating a position of a vehicle wheel on the vehicle platform 150 and adjust one or more actuators 22 in the roller deck assemblies to move the vehicle into an exchange position based the wheel position signal. In one example, the controller 10 may have computer readable instructions that when executed cause the controller 10 operate the one or more lifters, such as the first vehicle lifter 116 and the second vehicle lifter 118, in response to detecting the vehicle 160 on the vehicle platform 150, and adjust one or more actuators 22 of the battery chamber 162 to unload the empty battery and load the full battery. For example, the controller 10 may include a PLC having programed instructions to activate the lifters (e.g., up or down) in response to one or more sensors detecting the vehicle 160 in position on the vehicle platform 150. In another example, the controller 10 may have computer readable instructions that when executed cause the controller 10 to adjust one or more actuators 22 of the mobile tables to prepare the battery exchange station 100 for the a second vehicle in response to detecting a first vehicle, such as the vehicle 160, exiting the vehicle platform 150.

FIG. 2 shows a top view of the battery exchange station 100 described with reference to FIG. 1. Components illustrated with respect to the battery exchange station 100 that are shown in FIG. 1 are labeled similarly and not reintroduced.

The battery exchange station 100 may include one or more lifting mechanisms for moving the plurality of batteries between the storage racks and the vehicle platform 150. In one example, a first lifting mechanism 206 comprises a first lift platform 216, the first servomotor 106, the second servomotor 108, a first set of ball bearing guides 210 slideably coupling the first lift platform 216 to the first frame 102 and the second frame 202. The first servomotor 106 and the second servomotor 108 may be coupled to opposing sides of the first lift platform 216. In one example, second lifting mechanism 208 comprises a second lift platform 218, the third servomotor 110, the fourth servomotor 112, and a second set of ball bearing guides 212 slideably coupling the second lift platform 218 to the third frame 104 and the fourth frame 204. The third servomotor 110 and the fourth servomotor 112 may be coupled to opposing sides of the second lift platform 218.

In one example, vertical movement of a battery (e.g., parallel with the z-axis) may be achieved by positioning the battery on one of the first lift platform 216 and the second lift platform 218, and controlling the servomotors coupled thereto. For example, an amount or direction of electric current to the first servomotor 106 and the second servomotor 108 may be adjusted and, in response, the first lift platform 216 may glide vertically via the first set of ball bearing guides 210. The lifting mechanisms may include components for controlling lateral movement of batteries (e.g., parallel with the y-axis) stored in the storage racks, such as a pneumatic slides. Operation of the lifting mechanisms is described in more detail below with reference to FIG. 7 and FIGS. 9-10.

The vehicle platform 150 may include a plurality of rails arranged in parallel with the x-axis that guide the lateral movement of each mobile table. In one example, a first rail 220 and a second rail 222 guide the lateral movement of the first mobile table 140 (see FIG. 1) between the first storage rack 101 and the vehicle platform 150. A third rail 224 and a fourth rail 226 guide the lateral movement of the second mobile table 142 (see FIG. 1) between the second storage rack 103 and the vehicle platform 150. In one example, the rails control alignment of first mobile table 140 and the second mobile table 142 with the vehicle 160.

The vehicle platform 150 may include a third roller deck assembly 228 and a fourth roller deck assembly 230 that align with rear wheels of a vehicle, such as vehicle 160, when the vehicle pulls into the battery exchange station 100. A horizontal position of the vehicle may be adjusted by controlling rotation of one or more of the first roller deck assembly 126, the second roller deck assembly 144, the third roller deck assembly 228, and the fourth roller deck assembly 230. In this way, the battery exchange station 100 may guide a vehicle into an appropriate positon for exchanging the battery. The vehicle platform 150 may include a first security cover 232 and a second security cover 234. In one example, the security covers may protect components of the battery exchange station 100 from external elements while the battery exchange mechanism is in operation or stopped.

FIG. 3 shows a side view of the battery exchange station 100 described with reference to FIGS. 1-2. Components illustrated with respect to the battery exchange station 100 that are shown in FIGS. 1-2 are labeled similarly and not reintroduced.

The first mobile table 140 may comprise a main platform 314 having a plurality of rollers 316 (see FIG. 4 for more detail). A plurality of rail bearing guides may be positioned on an underside surface 318 of the first mobile table 140. Each rail bearing guide engages with one of the plurality of rails positioned on the vehicle platform 150. For example, the first mobile table 140 includes a first rail bearing guide 302 that engages with the first rail 220, a second rail bearing guide 304 that engages with the second rail 222, and a third rail bearing guide 306 that engages with a third rail 308. In one example, the rails, and the complementary rail bearing guides, e.g., the first rail 220 and the first rail bearing guide 302, etc. guide the movement of the first mobile table 140 between the first storage rack 101 and the vehicle platform 150. The second mobile table 142 (see FIG. 1) may similarly travel between the second storage rack 103 and the vehicle platform 150 via rail bearing guides that are guided by rails.

The first lift platform 216 of the first lifting mechanism 206 may be formed from a frame comprising a main lifter 320 and a lifter complement 322. The first lift platform 216 may be a substantially rectangular prism having an interior opening and open sides. The lifter complement 322 may selectively couple to the main lifter 320 via a plurality of locks 310. When the main lifter 320 and lifter complement 322 are coupled via the locks 310, the first lift platform 216 may be operated to move as a unit vertically. The interior opening and open sides of the first lift platform 216 may facilitate translation of the batteries between the battery storage spaces 136 and the first lifting mechanism 206, e.g., axially with respect the y axis. In addition, the interior opening and open sides of the first lift platform 216 may facilitate translation of the batteries between the first lifting mechanism 206 and the vehicle platform 150, e.g., axially with respect the x axis. In one example, the lifter complement 322 may be selectively de-coupled from the main lifter 320 and positioned on the first mobile table 140. When positioned on the first mobile table 140, the lifter complement 322 and the first mobile table 140 may be operated to move as a unit between the vehicle platform 150 and the first storage rack 101. In one example, a battery may be moved between one of the battery storage spaces 136 and the vehicle platform 150 via the selective coupling and de-coupling of the lifter complement 322 with the main lifter 320 and the first mobile table 140. The second lift platform 218 of the second lifting mechanism 208 (see FIG. 2) may be similarly constructed and operated.

The first lift platform 216 may slideably couple to the first frame 102 and the second frame 202. The first lifting mechanism 206 may include the first set of ball bearing guides 210 for guiding vertical movement of the first lift platform 216 relative to the first frame 102 and the second frame 202. The first set of ball bearing guides 210 may include a first rail portion 324 coupled to the first frame 102 and a first pair of ball bearings 326, 328 coupled to the main lifter 320. The first pair of ball bearings 326, 328 are slideably coupled to the first rail portion 324. The first set of ball bearing guides 210 may further include a second rail portion 332 coupled to the second frame 202 and a second pair of ball bearings 334, 336 coupled to the main lifter 320. The second pair of ball bearings 334, 336 are slideably coupled to the second rail portion 332. The second lifting mechanism 208 may be similarly constructed and operated.

FIG. 4 shows a perspective view 400 of a portion of the battery exchange station 100 described with reference to FIGS. 1-3. Components illustrated with respect to the battery exchange station 100 that are shown in FIGS. 1-3 are labeled similarly and not reintroduced.

The mobile tables, such as first mobile table 140 and second mobile table 142, may include selectable sets of rollers that enable conveying a battery laterally, e.g., to and from the vehicle platform 150, or horizontally, e.g., between battery storage spaces 136 (see FIG. 3). For example, the second mobile table 142 includes rows of rollers 402 arranged in parallel with the x-axis and columns of rollers 404 arranged in parallel with the y-axis. The rollers may be controlled for selectively conveying a battery positioned on the mobile table. For example, the rollers may have a first setting wherein the rows of rollers 402 are positioned above a surface plane 406 of the second mobile table 142 and the columns of rollers 404 are positioned below the surface plane 406. The rows of rollers 402 may then be rotated to convey a battery placed on the second mobile table 142 axially with respect to the x-axis. The rollers may have a second setting wherein the rows of rollers 402 are positioned below a surface plane 406 and the columns of rollers 404 are positioned above the surface plane 406. The columns of rollers 404 may then be rotated to convey the battery placed on the second mobile table 142 axially with respect to the y-axis. The first mobile table 140 may include similarly arranged sets of rollers having similar operation settings.

The perspective view 400 shows the battery exchange station 100 in a ready mode of a battery exchange routine. In one example, components of the battery exchange station 100 may be controlled, e.g., arranged, adjusted, to prepare the ready mode. The ready mode may include a first battery, such as a full battery 408, positioned on the first mobile table 140 and the first mobile table 140 in a first position on the vehicle platform 150. The first position may be a first threshold position that is calibrated to have the full battery 408 accessible to the battery chamber 162 (see FIG. 1 and below for more detail). The ready mode may include the second mobile table 142 in a second position on the vehicle platform 150. Similarly, the second position may be a second threshold position that is calibrated to have the second mobile table 142 accessible to the battery chamber 162. The ready mode may further include the rollers of the second mobile table 142 controlled in the first setting wherein the rows of rollers 402 are positioned above the surface plane 406 of the second mobile table 142 and the columns of rollers 404 are positioned below the surface plane 406. The ready mode may further include the rollers of the first mobile table 140 similarly controlled to facilitate coordinated loading of the full battery 408 and unloading of an empty battery (see FIGS. 6A-6B).

The vehicle 160 in an exchange position. In one example, the exchange position may be defined by a vehicle, such as the vehicle 160, being in a location on the vehicle platform 150 that allows access to the battery chamber 162 (see FIG. 1 and more detail in FIG. 5). In one example, the exchange position may include the vehicle 160 positioned over the first vehicle lifter 116, the second vehicle lifter 118, and so on, such that when raised, the lifters make contact with a complementary portion of the vehicle 160. In another example, one or more sensors 20 (see FIG. 1) may detect the vehicle in the exchange position. For example, the one or more sensors 20 may include wheel sensors positioned in or near the first roller deck assembly 126, the second roller deck assembly 144, and so on. In response to the wheel sensors detecting a position of the wheels of the vehicle 160 within than a threshold position, the battery exchange station 100 may actuate the first vehicle lifter 116, the second vehicle lifter 118, and so on to enable access to the battery chamber 162.

FIG. 5 shows an example of a dual component battery chamber (hereafter a battery chamber) 500 for a battery exchange station. The battery chamber 500 may be the same as or similar to the battery chamber 162 for the battery exchange station 100 described with reference to FIGS. 1-4. The battery chamber 500 may be approximately symmetrical across a first symmetry line 501 and a second symmetry line 503.

The battery chamber 500 may be included in a battery exchange mechanism for an electric vehicle. The battery chamber 500 includes a stationary component 502 and a mobile component 550. The stationary component 502 may be fixed to an electric vehicle, such as vehicle 160 (see FIGS. 1-4), and the mobile component 550 may be slideably coupled to the stationary component 502 such that the mobile component 550 may be lowered from the stationary component 502 when the electric vehicle is directly on the vehicle platform 150 (see FIGS. 1-4) and lifted via the one or more lifters (e.g., the first vehicle lifter 116, second vehicle lifter 118 in FIGS. 1-4). When lowered from the electric vehicle, the mobile component 550 may be partially enclosing a battery. The battery chamber 500 may be formed from hot rolled or cold rolled steel sheet with tensile strengths ranging from 45 millipascals (mPa) to 1500 mPa. Such material is common in stamping, roll forming, tube making, and automotive applications. In one example, material composition may include hot-rolled ferrite-bainite steels having a yield strength ranging from 440 to 620 mPa, a minimum ASTM total elongation of 15%, a minimum EN total elongation of 14%, and a minimum JIS total elongation of 17%. The stationary component 502 may be fixed to a vehicle frame using standard screws, e.g., M10×pitch 1500 mm.

The mobile component 550 may be slideably coupled to the stationary component 502 via one or more servomotor and spindle arrangements. For example, the battery chamber 500 includes a first servomotor 588, a second servomotor 582, a third servomotor 584, and a fourth servomotor 586. The servomotors may be joined to and control a spindle, such as first servomotor 588 joined to and controlling a spindle 590. The servomotors may be controlled by the controller 10 (see FIG. 1) to adjust a vertical position of the mobile component 550. For example, the first servomotor 588 may be controlled to rotate the spindle 590 in a first direction to lower the mobile component 550. The first servomotor 588 may be controlled to rotate the spindle 590 in a second direction to raise the mobile component 550. Proper alignment of the stationary component 502 and the mobile component 550 may be secured by a plurality of alignment rods. For example, the battery chamber 500 may include a first alignment rod 592, a second alignment rod 594, and third and fourth alignment rods (not shown). The alignment rod, e.g., first alignment rod 592, is always inside a corresponding hole in the mobile component 550, e.g., through-hole 571. The rods and through-holes have a tight adjustment to guide both the mobile component 550 and the stationary component 502 and are moved by the servomotors, e.g., first servomotor 588, second servomotor 582, and so on. The spindles, such as spindle 590, are long screws controlled by the servomotors to move the mobile component 550 via threads in the through-holes, such as through-hole 542. The servomotors 584, 586, 582 control similar spindles. The servomotors coordinated movements control the decoupling and coupling of the mobile component 550 with the stationary component 502 (e.g., the section of the battery chamber 500 fixed to the vehicle).

The stationary component 502 may be a five-sided container having an open bottom. The stationary component may include a plurality of panels, such as, a first upper panel 512, a first side panel 514, a second side panel 516, a third side panel 518, and a fourth side panel (not shown). The second side panel 516 opposes the first side panel 514 across the first symmetry line 501. The fourth side panel opposes the third side panel 518 across the second symmetry line 503. The first side panel 514 and the second side panel 516 may each be formed from a solid panel having a bent shape. The bent shape may be symmetrical across the second symmetry line 503. For example, the bent shape includes a first planar section 522 that may be parallel with an xz plane, a first bend 524 that curves into an yz plane, a second bend 526 that curves into an xz plane, and a second planar section 528 that may be parallel with an xz plane. The second side panel 516 may mirror the shape of the first side panel 514 with respect to the first symmetry line 501. The third side panel 518 and the fourth side panel may each be formed from a substantially flat and substantially rectangular panel having open sections. For example, the third side panel 518 has a first open section 520, a midbar 529, and a second open section 530. The first open section 520 and the second open section 530 may be rectangular cutouts in the third side panel 518. The third side panel 518 may be symmetrical across the first symmetry line 501. The fourth side panel may mirror the shape of the third side panel 518 across the second symmetry line 503.

The first upper panel 512 may be a substantially flat and substantially rectangular panel having open sections. Open sections of the first upper panel 512 may be formed by a plurality of bars having a plurality of spaces interposed therebetween. For example, the first upper panel 512 may include a first bar 532, a second bar 534, a space 536 interposed the first bar 532 and the second bar 534, and so on. The first upper panel 512 may include a first tab section 538 and a second tab section 540. The tab sections may include a plurality of through-holes through which the servomotor and spindle arrangements and the alignment rods may be mounted. For example, the first tab section 538 may include a first through-hole 542 that may be defined by an opening on a first upper surface 544 of the first upper panel 512, an opening on a lower surface (not shown) of the first upper panel 512 and a first inner cylindrical surface 546. The first through-hole 542 may align with the first servomotor 588. The first tab section 538 may include a second through hole 548 defined by an opening on the first upper surface 544 of the first upper panel 512, an opening on the lower surface (not shown) of the first upper panel 512 and a second inner cylindrical surface 549. The second through-hole 548 may align with the second alignment rod 594. Additional through-holes may be positioned in the first tab section 538, such as in a mirror orientation across the second symmetry line 503, and in the second tab section 540, such as in mirror orientation across the first symmetry line 501. In one example, the bent shape of the first side panel 514 and the second side panel 516 conforms to the shape of the tab sections of the first upper panel 512.

The mobile component 550 may be a four-sided container having open sides. The mobile component 550 may be symmetrical across a third symmetry line 505. The mobile component 550 may include a second upper panel 552 and an opposing, base panel 554, and a seventh side panel 556 and an opposing, eighth side panel 558. The seventh side panel 556 and the eighth side panel 558 may each be formed from a solid panel having a bent shape that mimics the bent shape of the stationary component 502. For example, the bent shape of the seventh side panel 556 includes a third planar section 560 that may be parallel with an xz plane, a third bend 562 that curves into an yz plane, a fourth bend 564 that curves into an xz plane, and a fourth planar section 566 that may be parallel with an xz plane. The bent shape of the seventh side panel 556 may be symmetrical across the second symmetry line 503. The eighth side panel 558 may mirror the shape of the seventh side panel 556 with respect to the first symmetry line 501.

The second upper panel 552 may be a substantially flat and substantially rectangular panel having open sections. Open sections of the second upper panel 552 may be formed by a plurality of bars 576 having a plurality of spaces 578 interposed therebetween (e.g., similar to the first upper panel 512). The second upper panel 552 may include a third tab section 596 and a fourth tab section (not shown) that mirrors the third tab section 596 with respect to the first symmetry line 501. The third tab section 596 conforms to and vertically aligns with the first tab section 538 of the stationary component 502. Similarly, the fourth tab section conforms to and vertically aligns with the second tab section 540 of the stationary component 502. The third tab section 596 may include a plurality of through-holes that align with the plurality of through-holes of the first tab section 538 through which servomotor and spindle arrangements and alignment rods may be inserted (e.g., first servomotor 588, second servomotor 582, first alignment rod 592, etc.). For example, the third tab section 596 may include a third through-hole 568 that aligns with the second servomotor 582 and a fourth through-hole 571 that aligns with the first alignment rod 592. Additional through-holes may be positioned in the third tab section 596, such as in a mirror orientation across the second symmetry line 503, and in the fourth tab section, such as in mirror orientation across the first symmetry line 501. The base panel 554 may mirror the second upper panel 552 across the third symmetry line 505. For example, the base panel 554 may mirror the second upper panel 552 across a plane formed on the third symmetry line 505 that is parallel with a plane formed on the x and y axes. In one example, a battery may rest on a base surface 570 of the base panel 554.

The mobile component 550 may include a first open side 572 and an opposing, second open side (not shown). The second upper panel 552 and the base panel 554 may define an upper and a lower vertical boundary, respectively, of the interior and the open sides of the mobile component 550. The seventh side panel 556 and eighth side panel 558 may define a front and a back horizontal boundary, respectively, of the interior and of the open sides of the mobile component 550. The open sides enable an empty battery to be unloaded from the battery chamber 500 at the same time that a full battery is loaded. Battery unloading and loading is described in more detail below with reference to FIGS. 6A-6B and FIG. 8.

Dimensions of the mobile component 550 may be relatively (slightly) smaller than dimensions of the stationary component 502 such that the mobile component 550 fits inside the stationary component 502 when the mobile component 550 is slideably coupled to the stationary component 502. For example, when the mobile component 550 is slideably coupled to the stationary component 502, the mobile component 550 may be positioned apart from the stationary component 502 with only a space there-between and no other components.

FIG. 6A and FIG. 6B show a first operation 600 and a second operation 650, respectively, of a battery exchange station. In one example, the first operation 600 may include in response to detecting a vehicle in an exchange position, lowering a mobile component from a stationary component of a dual component battery chamber. The second operation 650 may include unloading an empty battery at the same time a full battery is loaded into the mobile component. With the full battery loaded, the mobile component may be raised and joined to the stationary component of the dual component battery chamber. The battery exchange station may be the battery exchange station 100 described with reference to FIGS. 1-5. Components illustrated with respect to the battery exchange station 100 that are shown in FIGS. 1-3 are labeled similarly and not reintroduced. Some components of the battery exchange station 100 are omitted for simplicity and may be understood to be included in at least some examples of the system.

The battery exchange station 100 is configured to enable battery exchanging to proceed with reduced operations while the vehicle is on the vehicle platform, thereby reducing the overall driver wait time. To achieve reduced overall driver wait time, the battery exchange station 100 may be prepared for exchanging a vehicle battery before a first vehicle, such as the vehicle 160, is in position in the station. In one example, components of the battery exchange station 100 may be controlled to prepare a ready mode, such as described above with reference to FIG. 4.

Turning to 6A, the first operation 600 includes the battery exchange station 100 in the ready mode and the vehicle 160 in the exchange position, such as described above with reference to FIG. 4. In one example, the ready mode may include a first battery positioned on the first mobile table 140, the first mobile table 140 in a first position on the vehicle platform 150, and the second mobile table 142 in a second position on the vehicle platform 150. The first battery may be a full battery 602. First dotted line 640 may represent the first position. In one example, the first position may include the first mobile table 140 slid rightward on the vehicle platform 150 such that the main platform 314 of the first mobile table 140 makes surface contact with and/or interlocks with the rigid frame 128 of the first roller deck assembly 126. Second dotted line 642 may represent the second position. The second position may include the second mobile table 142 slid leftward on the vehicle platform 150 such that main platform 608 of the second mobile table 142 makes surface contact with and/or interlocks with a second rigid frame 610 of the second roller deck assembly 144. The ready mode may include further include the plurality of rollers 604 of the first mobile table 140 controlled in a first setting for conveying the full battery 602 axially, with respect to the x-axis, and the plurality of rollers 604 of the second mobile table 142 controlled in the first setting for conveying a second battery axially, with respect to the x-axis. The ready mode prepares the first mobile table 140 for loading the full battery 602 into the battery chamber 500 and the second mobile table 142 for receiving the second battery during unloading from the battery chamber 500.

The exchange position may be defined by the vehicle 160 being in a location on the vehicle platform 150 that allows access to the battery chamber 500. The exchange position may be detected variously such as via one or more of the sensors 20 (see FIG. 1). One or more position sensors may detect the vehicle 160 in the exchange position, such as, for example, by detecting a position of one or more vehicle wheels. In one example, the exchange position may include the vehicle 160 positioned over the first vehicle lifter 116, the second vehicle lifter 118, a third vehicle lifter, and a fourth vehicle lifter (not shown), such that when raised the lifters make contact with a complementary portion of the vehicle 160. For example, the lifters may make contact with a vehicle body structure that contains the battery chamber 500.

The first operation 600 may include, in response the lifters making contact with the complementary portion of the vehicle 160, actuating the first vehicle lifter 116, the second vehicle lifter 118, the third vehicle lifter, and the fourth vehicle lifter to raise the vehicle 160. In one example, the lifters may raise the vehicle 160 by a vertical dimension 614 above a wheel-contact surface 612 of each of the roller deck assemblies (e.g., first roller deck assembly 126, etc.). With the vehicle 160 lifted, the servomotor and spindle arrangements of the battery chamber 500 (e.g., the first servomotor 588, the second servomotor 582, etc.) may be controlled to lower the mobile component 550 from the stationary component 502. The mobile component 550 may partially enclose the second battery, hereafter an empty battery 652 (see FIG. 6B). For example, electric current may be supplied in first amount and/or in a first direction to each servomotor (e.g., first servomotor 588 in FIG. 5) to rotate the spindle (e.g., spindle 590 in FIG. 5) thereby releasing the mobile component 550 from the stationary component 502. The mobile component 550 may be lowered to a position aligning with the first mobile table 140 and the second mobile table 142. Particularly, the base surface 570 (see FIG. 5) of the mobile component 550 may be approximately flush with a first upper surface 616 of the first mobile table 140 and a second upper surface 618 of the second mobile table 142. In other words, the first upper surface 616 may be approximately level with the base surface 570 and the second upper surface 618 thereby forming a conveyor surface from the first mobile table 140, through the open sides of the mobile component 550, to the second mobile table 142.

Turning to 6B, the second operation 650 may include unloading the empty battery 652 while simultaneously the full battery 602 is loaded into the mobile component 550 of the battery chamber 500. In one example, in response to the mobile component 550 being decoupled from the stationary component 502 and lowered into alignment with the first mobile table 140 and the second mobile table 142, the controller 10 (see FIG. 1) may generate a first control signal to a first motor (not shown) controlling the plurality of rollers 604 of the first mobile table 140 and a second control signal to a second motor (not shown) controlling the plurality of rollers 604 of the second mobile table 142. For example, electric current may be supplied to the motors in first amount and/or in a first direction to rotate the plurality of rollers 604 around an axis of rotation that may be parallel with the y-axis thereby generating horizontal translation of the first upper surface 616 and the second upper surface 618. The rotation of the plurality of rollers 604 may slide the empty battery 652 onto the second mobile table 142 at the same time that the full battery 602 slides from the first mobile table 140 into the interior space of the mobile component 550.

With the full battery 602 loaded into the mobile component 550, the servomotor and spindle arrangements of the battery chamber 500 (e.g., the first servomotor 588, the second servomotor 582, etc.) may be adjusted to raise and couple the mobile component 550 to the stationary component 502 of the battery chamber 500. For example, electric current may be supplied in second amount and/or in a second direction to each servomotor (e.g., first servomotor 588 in FIG. 5) to rotate the spindle (e.g., spindle 590 in FIG. 5) thereby coupling the mobile component 550 with the stationary component 502. The first vehicle lifter 116, the second vehicle lifter 118, the third vehicle lifter, and the fourth vehicle lifter may be actuated to lower the vehicle 160 by the vertical dimension 614 thereby restoring contact of the vehicle wheels with the wheel-contact surface 612 of the roller deck assemblies (e.g., first roller deck assembly 126, second roller deck assembly 144, etc.). The vehicle 160 may be signaled to exit the station.

FIG. 7 shows an isometric view of an example of a battery storage rack 700 for a battery exchange station. The battery storage rack 700 may be the same or similar to the first storage rack 101 and the second storage rack 103 included in the battery exchange station 100 described with reference to FIGS. 1-6B. For example, the battery storage rack 700 includes a battery lifting mechanism 704, and a first storage unit 738 and a second storage unit 740 arranged on opposing sides of the battery lifting mechanism 704, which may be the same or similar to the first lifting mechanism 206, the first frame 102, and the second frame 202, respectively, described with reference to FIGS. 1-6B.

The battery exchange station disclosed herein is configured to achieve reduced overall driver wait time. While a first vehicle is exciting the vehicle platform 150 (see FIGS. 1-6B) and a second vehicle is pulling in, the battery exchange station performs operations to prepare a full battery for the battery exchange and to prepare a mobile table to receive an empty battery from the second vehicle. By carrying out operations that do not directly involve the second vehicle before the second vehicle is in position in the battery exchange station, overall driver wait may be reduced.

A mobile table 702 may coordinate with the battery lifting mechanism 704 to prepare the vehicle platform 150 for the second vehicle. For example, the mobile table 702 may transport a full battery or an empty battery to and from the battery lifting mechanism 704 and the vehicle platform 150 via a plurality of rails 701. The battery storage rack 700 may store a plurality of batteries 780 in the first storage unit 738 and the second storage unit 740. In one example, the plurality of batteries 780 may be full batteries (e.g., fully charged) that may be transported to the vehicle platform 150 via the mobile table 702. In another example, the plurality of batteries 780 may be charging batteries, e.g., recently transported away from the vehicle platform 150 via the mobile table 702.

The battery lifting mechanism 704 may include a lift platform 706. The lift platform 706 may be a substantially rectangular prism shaped frame (e.g., a container) having open sides and a selectively couple-able floor. The lift platform 706 may comprise a main lifter 708 and a lifter complement 710. The lift platform 706 may be formed by a plurality of bars 726. The main lifter 708 may include an upper frame 724, a first side frame 728 and an opposing, a second side frame 730, a third side frame 732, and an opposing, fourth side frame 734, and a lower frame 736. The upper frame 724 may define an upper vertical boundary of the lift platform 706. The first side frame 728 and second side frame 730 may define perimeter boundaries of the open sides arranged in parallel with an yz plane. The third side frame 732 and the fourth side frame 734 may define perimeter boundaries of the open sides arranged in parallel with an xz plane. The lower frame 736 may be arranged in parallel with the upper frame 724. The lifter complement 710 may be a substantially flat and rectangular member. The lifter complement 710 may be shaped to fit within an opening of and selectively couple to the lower frame 736 of the main lifter 708. When coupled, the lower frame 736 and the lifter complement 710 form a lower vertical boundary (e.g., the floor) of the lift platform 706. In one example, the lifter complement 710 may couple to the main lifter 708 via a plurality of locks 712 that engage with a plurality of pneumatic units 714. The main lifter 708 and lifter complement 710 may be moved as a unit to adjust a vertical position of a battery. When de-coupled from the main lifter 708, the lifter complement 710 may rest on an upper surface 718 of the mobile table 702.

The battery lifting mechanism 704 may operate a first servomotor 748 with a first spindle 750 and a second servomotor 752 with a second spindle 754 to adjust a vertical position of the lift platform 706. The lift platform 706 may slide up and down relative to the first storage unit 738 and the second storage unit 740. The vertical sliding may be guided by a plurality of ball bearing guides (e.g., a set of ball bearing guides) that slidingly couple the lift platform 706 to the first storage unit 738 and the second storage unit 740. Each ball bearing guide of the plurality may include a rail portion 742, an upper bearing unit 744, and a lower bearing unit 746. For example, a first ball bearing guide 764 may couple a first leg 756 of the second storage unit 740 to a storage unit-facing surface (not shown) of the main lifter 708. Similarly, a second ball bearing guide 766 may couple a storage unit-facing surface 758 of the main lifter 708 to a second leg 768 of the first storage unit 738. In one example, the battery storage rack 700 may include a third linear ball bearing guide (not shown) coupling a third leg of the first storage unit 738 to the main lifter 708 and a fourth linear ball bearing guide 770 coupling a fourth leg 772 of the second storage unit 740 to the main lifter 708.

The lifter complement 710 may include a plurality of lift rollers 716. The mobile table 702 may include a plurality of table rollers 722. In one example, the lift rollers 716 and the table rollers 722 may have selectable settings, such as described with reference to FIG. 4. For example, when the lifter complement 710 and the main lifter 708 are coupled via the locks 712, the lift rollers 716 may be controlled in a first setting to convey a battery placed on the lift platform 706 axially with respect to the y-axis. When the lifter complement 710 is positioned on the mobile table 702, a second setting may be activated wherein the lift rollers 716 are lowered below a surface plane 720 of the lifter complement 710 and the table rollers 722 are rotated to convey a battery placed thereon axially with respect to the x-axis. In one example, the table rollers 722 and the lift rollers 716, may be idle rollers or conveyor rollers that operate with laser presence sensors to automatically activate an electrical mechanism to which they are connected, such as programmed through a PLC.

The lift platform 706 includes a pneumatic table unit 774. The pneumatic table unit 774 includes a first linear member 776 coupled to an interior surface of the first side frame 728 and a second linear member 778 coupled to an interior surface of the second side frame 730. The pneumatic table unit 774 may be operated to slide a battery onto and off from the lift platform 706. For example, when the pneumatic table unit 774 detects a battery, the pneumatic table unit 774 is automatically activated and the battery is pushed. Operation of the pneumatic table unit 774 may be programmed through the PLC.

The battery storage rack 700 may perform similar operations to prepare a full battery for vehicle loading and to prepare a mobile table 702 to receive an empty battery. During an interim between the first vehicle exiting the station, such as the vehicle 160, and the second vehicle entering, the battery exchange station may be prepared for the second vehicle. In one example, to prepare the mobile table 702 to receive an empty battery from the second vehicle, an empty battery unloaded from the first vehicle may be conveyed via the mobile table 702 to the battery storage rack 700. The battery lifting mechanism 704 may be operated to transport the empty battery to a position for charging (e.g., a designated shelf 760), such as determined by the controller 10 (see FIG. 1).

In one example, the mobile table 702 carrying the empty battery may be slid via the plurality of rails 701 to a position below the main lifter 708. With the mobile table 702 aligned with the main lifter 708, the first servomotor 748 and the second servomotor 752 may be operated to lower the main lifter 708 until the lower frame 736 and the lifter complement 710 are flush. In one example, a first vertical position of the main lifter 708 for aligning with the lifter complement 710 may be stored in the memory 14 of the controller 10 (see FIG. 1). The plurality of locks 712 that engage with the plurality of pneumatic units 714 may be actuated to couple the lifter complement 710 to the main lifter 708. With the lifter complement 710 coupled to the main lifter 708, the first servomotor 748 and the second servomotor 752 may be operated to raise the lift platform 706 carrying the empty battery. The lift platform 706 may be raised to the designated shelf 760. In one example, the designated shelf 760 may be a second vertical position determined by the controller 10. The lift rollers 716 and the pneumatic table unit 774 may be controlled to slide the empty battery from the lift platform 706 onto the designated shelf 760. Once unloaded, the lift rollers 716 may be lowered below the surface plane 720 of the lifter complement 710 and the rotation stopped. The first servomotor 748 and the second servomotor 752 may be operated to lower the lift platform 706 until the lifter complement 710 aligns with the mobile table 702. In one example, the alignment may be controlled by lowering the lift platform 706 to the first vertical position described above. The plurality of locks 712 that engage with the plurality of pneumatic units 714 may be actuated to release the lifter complement 710 from the main lifter 708. When unloaded of the empty battery, the mobile table 702 may be slid to the vehicle platform 150 to receive another empty battery.

Similarly, to prepare a full battery for the second vehicle, the mobile table 702 may be slid to the battery storage rack 700 whereat the battery lifting mechanism 704 may be operated to unload a full battery onto the lift platform 706. The lift platform 706 carrying the full battery may be lowered until the lifter complement 710 is in alignment with the mobile table 702. The locks 712 may be actuated to release the lifter complement 710 and full battery onto the mobile table 702. The full battery may be conveyed via the mobile table 702 to the vehicle platform 150 to load the battery into the second vehicle.

Figure 8:
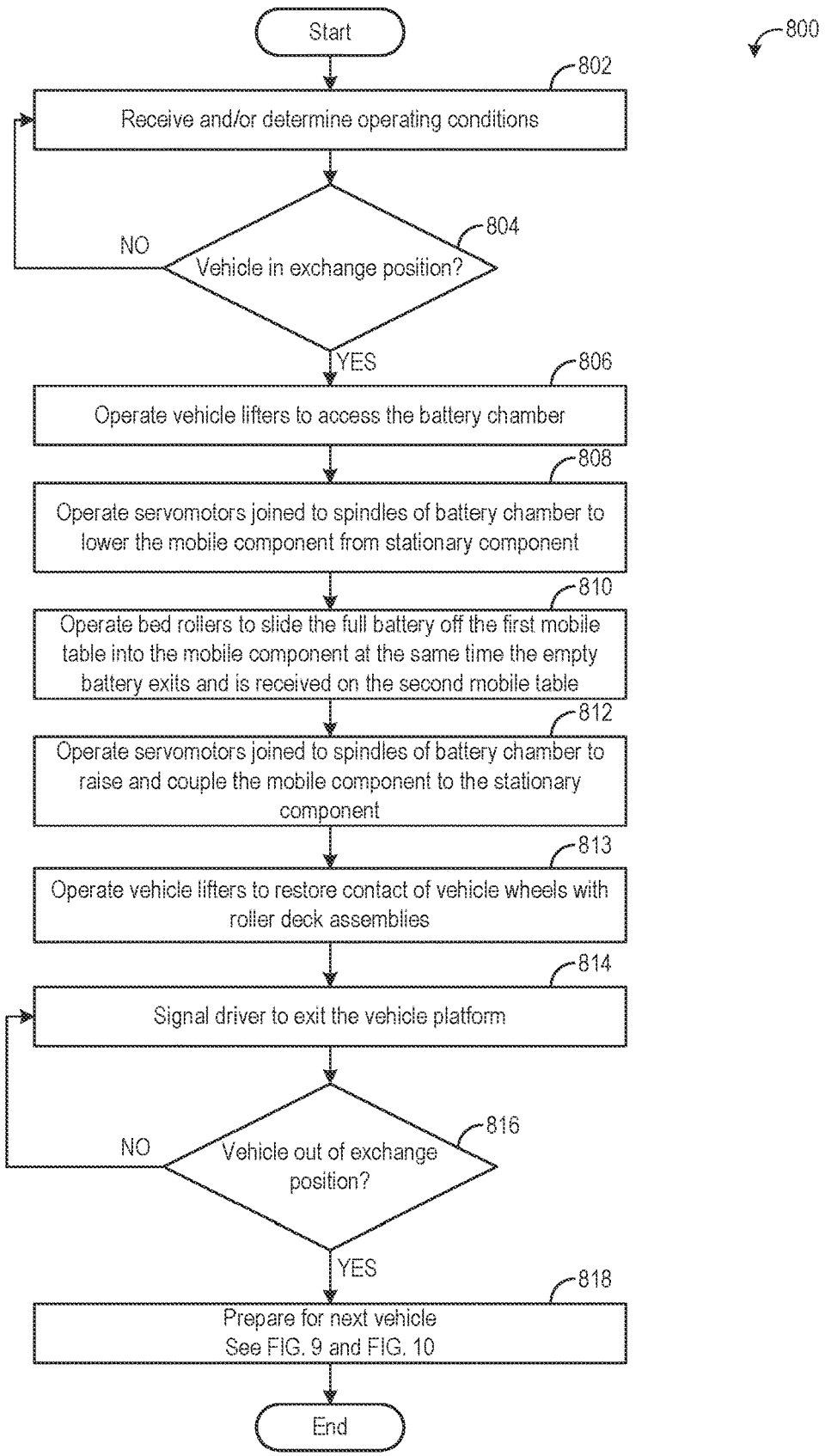
FIG. 8 shows a first method for a battery exchange station.
Figure 9:
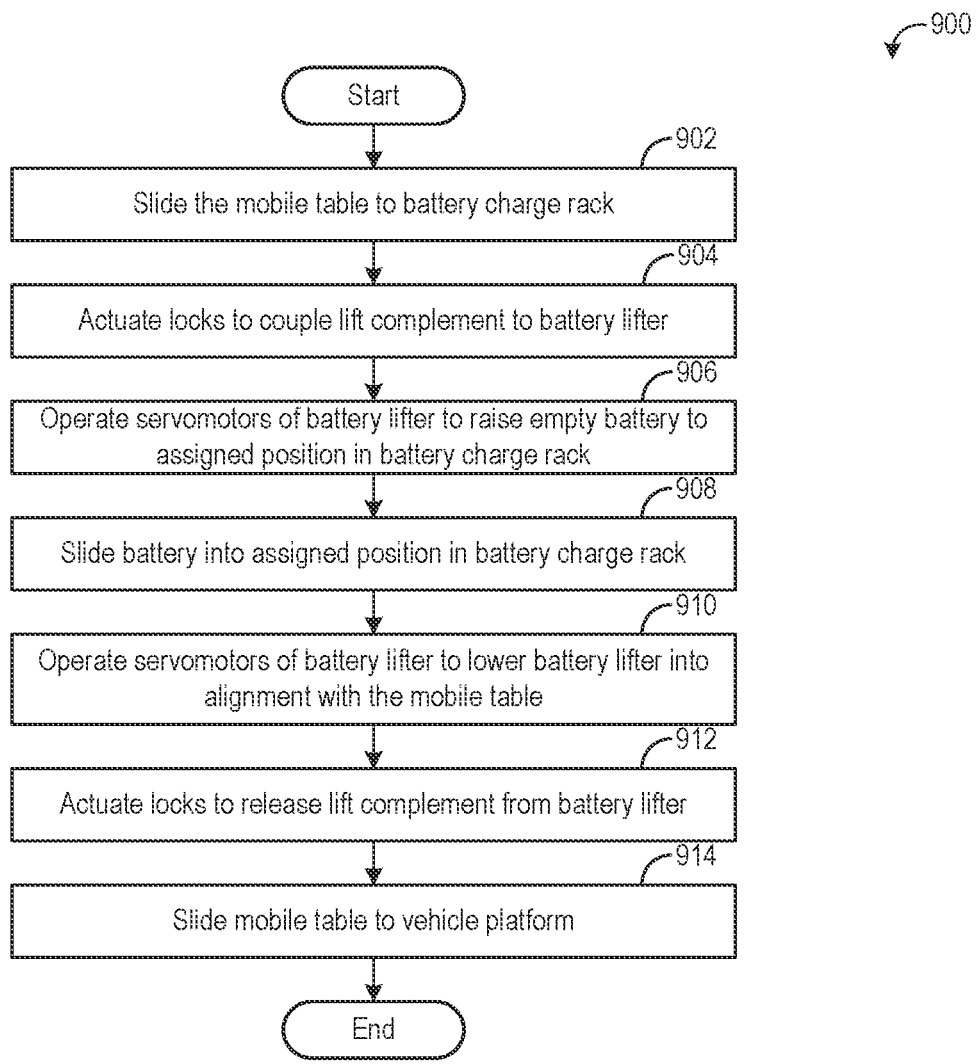
FIG. 9 shows a second method for a battery exchange station.
Figure 10:
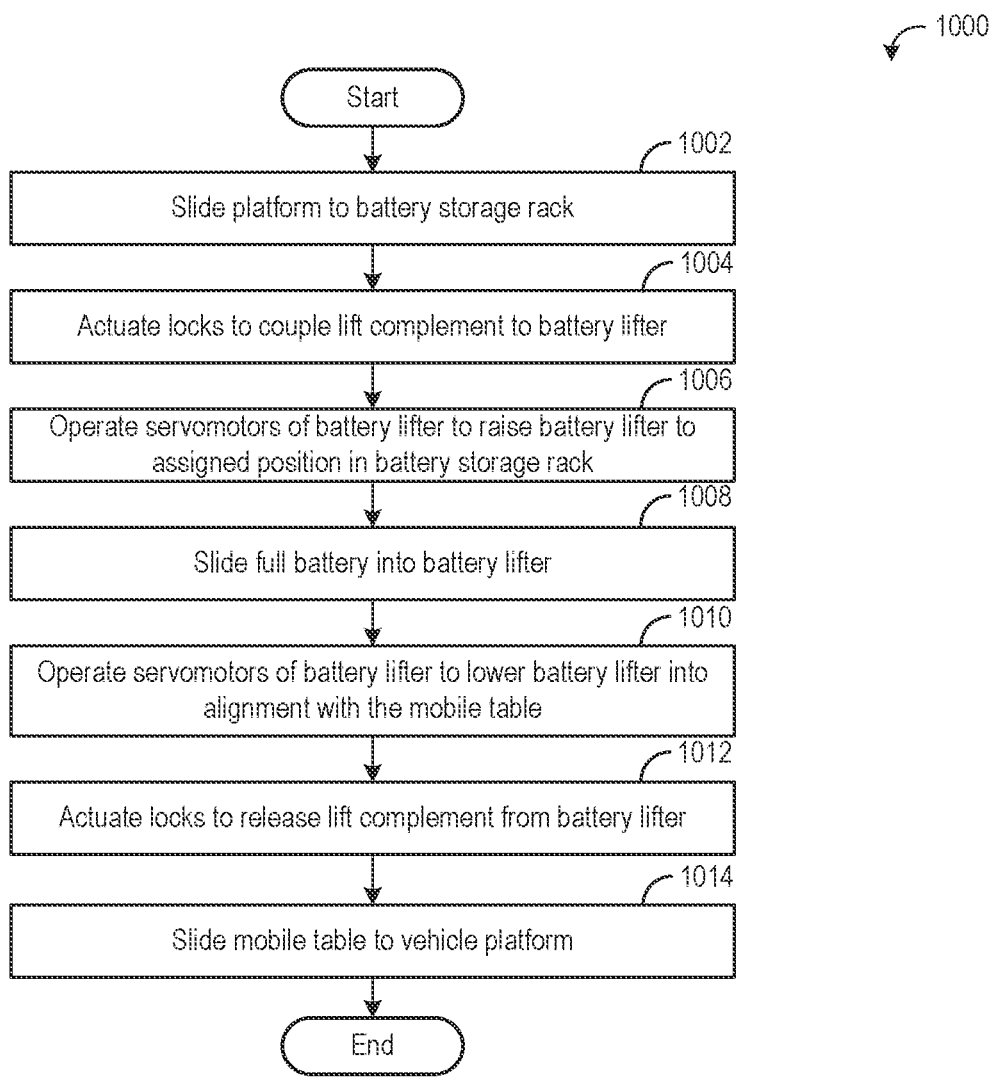
FIG. 10 shows a third method for a battery exchange station.

Example control methods for a battery exchange station are shown in methods 800, 900, and 1000 in FIGS. 8-10, respectively. In one example, the battery exchange station may be the battery exchange station 100 and the vehicle may be the vehicle 160 described with reference to FIGS. 1-7. Method 800 is a flowchart describing a routine for exchanging a vehicle battery of a BEV. Method 900 is a flowchart describing a first routine for preparing a battery exchange station for a battery exchange. Method 1000 is a flowchart describing a second routine for preparing a battery exchange station for a battery exchange. Instructions for carrying out method 800 and the rest of the methods included herein may be executed by a controller based on instructions stored on a memory of the controller and in conjunction with signals received from sensors of the battery exchange station, such as the controller 10, microprocessor unit 12, memory 14, and sensors 20 described above with reference to FIG. 1. The controller may employ actuators of the battery exchange station to adjust station operation, such one or more of the actuators 22, the first vehicle lifter 116, the second vehicle lifter 118, the first servomotor 106, the second servomotor 108, the first servomotor 588, etc. described above with reference to FIGS. 1-7, according to the methods described below.

At 802, the method 800 may include receiving and/or determining operating conditions. In one example, the operating conditions may include the battery exchange station in a ready mode. The ready mode may include a first battery, hereafter a full battery, positioned on a first mobile table and the first mobile table in a first position on the vehicle platform (e.g., first mobile table 140, vehicle platform 150 in FIG. 1). The first position may be a first threshold position that is calibrated to have the full battery accessible to the mobile component of the battery chamber, e.g., adjacent to a first open side of the mobile component. In another example, the ready mode may include a second mobile table in a second position on the vehicle platform (e.g., second mobile table 142 in FIG. 1). Similarly, the second position may be a second threshold position that is calibrated to have the second mobile table accessible to the mobile component of battery chamber. For example, the second position may be calibrated for unloading a second battery, hereafter an empty battery. In one example, the second position may be adjacent to an opposing, second open side of the mobile component. The ready mode may further include the rollers of the first mobile table and the second mobile table controlled in a first control setting to facilitate coordinated loading of the full battery and unloading of an empty battery. In one example, operating conditions may include a presence or position of a vehicle on the vehicle platform. For example, one or more sensors may measure or detect the position of the vehicle on the vehicle platform. One or more operating conditions may include preparation instructions for preparing the battery exchange station for the next vehicle, such as a designated position in the battery charging rack for the empty battery and an assigned full battery to obtain from the battery storage rack.

At 804, the method 800 may include determining whether the vehicle is in an exchange position. In one example, the exchange position may be defined by the vehicle being in a location on the vehicle platform that allows access to the battery chamber. For example, the exchange position may include the vehicle positioned over the plurality of vehicle lifters, such that when raised the lifters make contact with a complementary portion of the vehicle. The exchange position may be a threshold exchange position that is calibrated to enable the battery exchange station to access the battery chamber. In one example, one or more sensors may detect the vehicle in the exchange position, such as based on detecting alignment with the rails (e.g., first rail 220, second rail 222) and a servomotor contacting the internal face of a vehicle tire.

In response to determining the vehicle is not in the exchange position, the method may include receiving and/or determining operating conditions at 802. In one example, in response to determining the vehicle is not in the exchange position, the method may include controlling one or more roller deck assemblies (e.g., first roller deck assembly 126) of the vehicle platform to adjust the position of the vehicle. In another example, in response to determining the vehicle is not in the exchange position, the method may include generating a message alerting the driver to adjust the vehicle position. The message may be displayed to the driver on a display screen in the battery exchange station.

In response to determining the vehicle is in the exchange position, the method 800 may include operating vehicle lifters to access the battery chamber at 806 (e.g., battery chamber 162 in FIG. 1, battery chamber 500 in FIG. 5). For example, the controller may generate a control signal that is sent to the lifter actuators.

At 808, the method 800 may include operating servomotors joined to spindles of the battery chamber to lower the mobile component from the stationary component (e.g., mobile component 550 and stationary component 502 in FIG. 5). In one example, the controller may generate a control signal that is sent to the servomotors. In one example, the control signal may be an amount of electrical current or a direction of electrical current that rotates the servomotors to release the mobile component from the stationary component.

At 810, the method 800 may include operating the table rollers to slide the full battery off the first mobile table into the mobile component at the same time the empty battery exits and is received on the second mobile table. In one example, the table rollers may be controlled to convey the full battery and the empty battery axially with respect to a first axis, and wherein the mobile component has open sides arranged axially with respect to the first axis. In one example, the controller may generate a control signal that is sent to the table roller actuators (e.g., motors). In one example, the table roller actuators may be controlled to rotate until a threshold position of the full battery is detected by a sensor. In another example, the table roller actuators may be controlled to rotate for a threshold time, wherein the threshold time is calibrated to move the empty battery onto the second mobile table and the full battery into the mobile component.

At 812, the method 800 may include operating servomotors joined to spindles of the battery chamber to raise and couple the mobile component to the stationary component.

In one example, the controller may generate a control signal that is sent to the servomotors. In one example, the control signal may be an amount of electrical current or a direction of electrical current that rotates the servomotors to couple the mobile component to the stationary component.

At 813, the method 800 may include operating vehicle lifters to restore contact of vehicle wheels with one or more roller deck assemblies (e.g., the wheel-contact surface 612 of the first roller deck assembly 126 in FIG. 6A-6B). For example, the controller may generate a control signal that is sent to the lifter actuators.

At 814, the method 800 may include signaling the driver to exit the vehicle platform. For example, the method may include generating a message alerting the driver to exit the vehicle platform. The message may be displayed to the driver on a display screen in the battery exchange station.

At 816, the method may include determining whether the vehicle is out of the exchange position. For example, the controller may determine the vehicle is out of the exchange position based on a position sensor indicating the vehicle exceeds a threshold position. As another example, the controller may determine the vehicle is out of the exchange position based on a scale detecting a weight on the vehicle platform is less than a threshold weight.

In response to determining the vehicle is not out of the exchange position, the method 800 may include signaling the driver to exit the vehicle platform at 814. In response to determining the vehicle is out of the exchange position, the method 800 may include preparing for the next vehicle at 818. In one example, the method may include controlling components of the battery exchange station to prepare the ready mode. For example, the empty battery may be removed from the second mobile table and stored for charging and a third battery, e.g., another full battery, may be unloaded from storage onto the first mobile table. In one example, the next vehicle may be prepared according to the method 900 and the method 1000.

Turning to FIG. 9, the method 900 for preparing the battery exchange station for exchanging a battery is shown. In one example, the method 900 may be executed during an interim between a first vehicle exiting and a second vehicle pulling into the battery exchange station. In one example, the method 900 may be executed at approximately the same time as the method 1000 described below with reference to FIG. 10.

At 902, the method 900 may include sliding the mobile table carrying an empty battery to the battery charge rack. The battery charge rack may be a battery storage rack where discharged batteries are stored for charging (e.g., second storage rack 103 in FIG. 1). In one example, the controller may generate a control signal to a slide actuator controlling one or more ball bearing guide and rail mechanisms (e.g., first rail bearing guide 302 and first rail 220 in FIG. 3). In one example the mobile table may be slid to a threshold position whereat the mobile table is in alignment with the battery lifter of the battery charge rack (e.g., lift platform 706 in FIG. 7).

At 904, the method 900 may include actuating locks to couple the lifter complement to the battery lifter. In one example, in response to determining the mobile table is in the threshold position (e.g., aligned with the battery lifter), the controller may generate a control signal to actuate the plurality of locks that engage with the plurality of pneumatic units to couple the lifter complement to the battery lifter (e.g., locks 712, pneumatic units 714 in FIG. 7).

At 906, the method 900 may include operating servomotors of the battery lifter to raise the empty battery to an assigned position in the battery charge rack. In one example, the assigned position (e.g., designated shelf 760 in FIG. 7) may be determined by the controller and received by the battery exchange station according to the method 800. In one example, the controller may generate a control signal that is sent to the servomotors. For example, the control signal may be a first direction and duration of electrical current that causes the servomotors to rotate the spindles coupled thereto, thereby raising the battery lifter level with the assigned position in the battery charge rack.

At 908, the method 900 may include sliding the empty battery into the assigned position in the battery charge rack. In one example, the controller may generate a first control signal that is sent to lift roller actuators of the battery lifter and a second control signal that is sent to the pneumatic table unit (e.g., lift rollers, pneumatic table unit 774 in FIG. 7). For example, the first control signal may be an amount and/or direction of electrical current sent to a lift roller motor that produces rotation of the lift rollers. The second control signal may be an amount of electrical current sent to the pneumatic table unit to slide a battery into the assigned position.

At 910, the method 900 may include operating servomotors of the battery lifter to lower the battery lifter (unloaded of the empty battery) into alignment with the mobile table. In one example, the controller may generate a control signal that is sent to the servomotors. For example, the control signal may be a second direction and duration of electrical current that causes the servomotors to rotate the spindles coupled thereto, thereby lower the battery lifter level with the mobile table.

At 912, the method 900 may include actuating locks to release the lifter complement from the battery lifter. In one example, in response to determining the mobile table is in the threshold position (e.g., aligned with the battery lifter), the controller may generate a control signal to actuate disengagement of the lock and pneumatic units, thereby de-coupling the lifter complement from the battery lifter.

At 914, the method 900 may include sliding the mobile table (unloaded of the empty battery) to the vehicle platform. In one example, the controller may generate a control signal to a slide actuator controlling the one or more ball bearing guide and rail mechanisms. In one example, the mobile table may be slid to a threshold position that is calibrated to have the mobile table accessible to the battery chamber.

Turning to FIG. 10, the method 1000 for preparing the battery exchange station for exchanging a battery is shown. In one example, the method 1000 may be executed during an interim between a first vehicle exiting and a second vehicle pulling into the battery exchange station. In one example, the method 1000 may be executed at approximately the same time as the method 900 described above with reference to FIG. 9.

At 1002, the method 1000 may include sliding the mobile table to the battery storage rack. The battery storage rack may be a rack where fully charged batteries are stored (e.g., first storage rack 101 in FIG. 1). In one example, the controller may generate a control signal to a slide actuator controlling one or more rail bearing guide and rail mechanisms (e.g., first rail bearing guide 302 and first rail 220 in FIG. 3). In one example the mobile table may be slid to a threshold position whereat the mobile table is in alignment with the battery lifter of the battery storage rack (e.g., lift platform 706 in FIG. 7).

At 1004, the method 1000 may include actuating locks to couple the lifter complement to the battery lifter. In one example, in response to determining the mobile table is in the threshold position (e.g., aligned with the battery lifter), the controller may generate a control signal to actuate the plurality of locks that engage with the plurality of pneumatic units to couple the lifter complement to the battery lifter (e.g., locks 712, pneumatic units 714 in FIG. 7).

At 1006, the method 1000 may include operating servomotors of the battery lifter to raise the battery lifter to an assigned position in the battery storage rack. In one example, the assigned position may be the shelf where an assigned battery is stored. In one example, the assigned position (e.g., designated shelf 760 in FIG. 7) may be determined by the controller and received by the battery exchange station according to the method 800. In one example, the controller may generate a control signal that is sent to the servomotors. For example, the control signal may be a first direction and duration of electrical current that causes the servomotors to rotate the spindles coupled thereto, thereby raising the battery lifter level with the assigned position in the battery storage rack.

At 1008, the method 1000 may include sliding the full battery into the battery lifter. In one example, the controller may generate a first control signal that is sent to lift roller actuators of the battery lifter and a second control signal that is sent to the pneumatic table unit (e.g., lift rollers 716, pneumatic table unit 774 in FIG. 7). For example, the first control signal may be an amount and/or direction of electrical current sent to a lift roller motor that produces rotation of the lift rollers. The second control signal may be an amount of electrical current sent to the pneumatic table unit to slide the full battery onto the battery lifter.

At 1010, the method 1000 may include operating servomotors of the battery lifter to lower the battery lifter into alignment with the mobile table. In one example, the controller may generate a control signal that is sent to the servomotors. For example, the control signal may be a second direction and duration of electrical current that causes the servomotors to rotate the spindles coupled thereto, thereby lower the battery lifter level with the mobile table.

At 1012, the method 1000 may include actuating locks to release the lifter complement from the battery lifter. In one example, in response to determining the mobile table is in the threshold position (e.g., aligned with the battery lifter), the controller may generate a control signal to actuate disengagement of the lock and pneumatic units, thereby de-coupling the lifter complement from the battery lifter.

At 1014, the method 1000 may include sliding the mobile table (loaded with the fully charged battery) to the vehicle platform. In one example, the controller may generate a control signal to a slide actuator controlling the one or more ball bearing guide and rail mechanisms. In one example, the mobile table may be slid to a threshold position that is calibrated to have the full battery accessible to the battery chamber.

In this way, a battery exchange station for battery electric vehicles provides electrical power for vehicle travel with reduced driver wait time. As a result, drivers may experience reduced range anxiety and increased confidence in BEV performance. The battery charging station may provide an alternative fueling approach to the more common vehicle charging stations. Currently, BEV charging infrastructure is overwhelmingly represented by vehicle charging stations. For example, public and private investment in BEV charging stations, such as in parking lots, is relatively common. Few examples exist of commercially available battery exchanging stations. Such an approach has numerous advantages. For example, battery exchanging may be much more competitive with traditional gasoline fueling stations in terms of convenience. Relatedly, by reducing the total time to provide a charged battery, the battery exchange station may be able to service more customers than BEV charging stations. As another example, battery exchanging may open up opportunities for battery lease programs that can reduce the upfront cost to a consumer to purchase a BEV. The technical effect of the disclosed methods and systems is increased efficiency to exchange a BEV battery.

The disclosure also provides support for a battery exchange station for an electric vehicle, comprising: a vehicle platform including one or more lifters, a first storage rack positioned on a first side of the vehicle platform and a second storage rack positioned on an opposing, second side of the vehicle platform, the first storage rack and the second storage rack storing a plurality of batteries, and a battery exchange mechanism comprising a dual component battery chamber, a first mobile table, and a second mobile table, the dual component battery chamber including a stationary component fixed to the electric vehicle and a mobile component slideably coupled to the stationary component, wherein the mobile component is released from the stationary component when the electric vehicle is directly on the vehicle platform and lifted via the one or more lifters. In a first example of the system, the mobile component partially encloses a first battery and the first mobile table positions a second battery adjacent to the mobile component. In a second example of the system, optionally including the first example, the mobile component is slideably coupled to the stationary component via one or more servomotor and spindle arrangements. In a third example of the system, optionally including one or both of the first and second examples, the mobile component is aligned with the stationary component via a plurality of alignment rods. In a fourth example of the system, optionally including one or more or each of the first through third examples, the system further comprises: a plurality of rails, the plurality of rails guiding translation of the first mobile table between the vehicle platform and the first storage rack and the second mobile table between the vehicle platform and the second storage rack. In a fifth example of the system, optionally including one or more or each of the first through fourth examples, the first mobile table and the second mobile table comprise a plurality of rollers, the plurality of rollers selectively conveying a battery axially with respect to a first axis, and wherein the mobile component has open sides arranged axially with respect to the first axis. In a sixth example of the system, optionally including one or more or each of the first through fifth examples, the mobile component is lowered from the stationary component into alignment with the first mobile table and the second mobile table, wherein a base of the mobile component is approximately level with a first upper surface of the first mobile table and with a second upper surface of the second mobile table, the alignment forming a conveyor surface from the first mobile table through the open sides of the mobile component to the second mobile table. In a seventh example of the system, optionally including one or more or each of the first through sixth examples, the first storage rack comprises a battery lifter, and a first storage unit and a second storage unit arranged on opposing sides of the battery lifter, the first storage unit and the second storage unit comprising a plurality of shelves having an opening facing the battery lifter. In an eighth example of the system, optionally including one or more or each of the first through seventh examples, the battery lifter comprises a lift platform slideably coupled to the first storage rack and the second storage rack, and a pair of servomotors coupled to the lift platform, wherein the lift platform has open sides and is vertically translatable via operating the pair of servomotors. In a ninth example of the system, optionally including one or more or each of the first through eighth examples, the lift platform comprises a main lifter and a lifter complement, the lifter complement selectively coupling to the main lifter via a plurality of locks and selectively coupling to the first mobile table.

The disclosure also provides support for a method for a battery exchange station for an electric vehicle, the method comprising: detecting the electric vehicle on a vehicle platform, the vehicle platform having a first battery positioned on a first mobile table and a second mobile table, lifting the electric vehicle via one or more lifters, decoupling a mobile component of a dual component battery chamber from a stationary component of the dual component battery chamber, the stationary component fixed to the electric vehicle and the mobile component partially enclosing a second battery, and sliding the first battery off the first mobile table into the mobile component while simultaneously unloading the second battery onto the second mobile table. In a first example of the method, the method further comprises: coupling the mobile component to the stationary component, the mobile component containing the first battery, and lowering the one or more lifters. In a second example of the method, optionally including the first example, the first mobile table and the second mobile table comprise a plurality of rollers, the plurality of rollers selectively conveying the first battery and the second battery axially with respect to a first axis, and wherein the mobile component has open sides arranged axially with respect to the first axis. In a third example of the method, optionally including one or both of the first and second examples, the decoupling comprises lowering the mobile component into an alignment with the first mobile table and the second mobile table, wherein a base surface of the mobile component is approximately level with a first upper surface of the first mobile table and with a second upper surface of the second mobile table, the alignment forming a conveyor surface from the first mobile table through the open sides of the mobile component to the second mobile table. In a fourth example of the method, optionally including one or more or each of the first through third examples, the method further comprises: in response to the electric vehicle exiting the vehicle platform, sliding the first mobile table to a battery storage rack, operating a first lifting mechanism to position a battery on the first mobile table, and sliding the first mobile table to the vehicle platform, sliding the second mobile table to a battery charge rack, operating a second lifting mechanism to store the second battery in the battery charge rack, and sliding the second mobile table to the vehicle platform.

The disclosure also provides support for a battery exchange system for an electric vehicle, comprising: a vehicle platform including one or more lifters, a first storage rack positioned on a first side of the vehicle platform and a second storage rack positioned on an opposing, second side of the vehicle platform, the first storage rack and the second storage rack storing a plurality of batteries, a battery exchange mechanism comprising a dual component battery chamber, and a plurality of mobile tables having rollers, the dual component battery chamber including a stationary component fixed to the electric vehicle and a mobile component selectively coupled to the stationary component via one or more servomotor and spindle arrangements, and a controller with computer readable instructions stored on non-transitory memory that when executed cause the controller to: operate the one or more lifters in response to detecting the electric vehicle positioned on the vehicle platform, operate the one or more servomotor and spindle arrangements to release the mobile component from the stationary component of the dual component battery chamber, the mobile component containing a first battery, and operate the rollers of the plurality of mobile tables to position a second battery inside the mobile component while simultaneously positioning the first battery on one of the plurality of mobile tables. In a first example of the system, the controller further includes computer readable instructions stored on the non-transitory memory that when executed cause the controller to: operate the one or more servomotor and spindle arrangements to raise the mobile component and couple the mobile component to the stationary component of the dual component battery chamber, the mobile component containing the second battery. In a second example of the system, optionally including the first example, the controller further includes computer readable instructions stored on the non-transitory memory that when executed cause the controller to: in response to detecting the electric vehicle exit the vehicle platform, prepare the vehicle platform for a second vehicle including slide a first mobile table to a first lifting mechanism, operate the first lifting mechanism to unload a third battery from the first storage rack onto the first mobile table, slide a second mobile table to a second lifting mechanism, operate the second lifting mechanism to load the second battery into the second storage rack, and slide the first mobile table and the second mobile table to the vehicle platform. In a third example of the system, optionally including one or both of the first and second examples, the system further comprises: a plurality of rails, the plurality of rails guiding translation of a first mobile table between the vehicle platform and the first storage rack and a second mobile table between the vehicle platform and the second storage rack. In a fourth example of the system, optionally including one or more or each of the first through third examples, the first storage rack comprises a battery lifter, and a first storage unit and a second storage unit arranged on opposing sides of the battery lifter, the first storage unit and the second storage unit comprising a plurality of shelves having an opening facing the battery lifter.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery exchange station for an electric vehicle, comprising:
    a vehicle platform including one or more lifters movable to lift the electric vehicle along a vertical axis;
    a first storage rack positioned on a first side of the vehicle platform and a second storage rack positioned on an opposing, second side of the vehicle platform, the first storage rack and the second storage rack storing a plurality of batteries; and
    a battery exchange mechanism comprising a first mobile table and a second mobile table, the first mobile table configured to position a second battery within a mobile component of a dual component battery chamber while the second mobile table receives a first battery from the mobile component, the first mobile table positioned on the first side of the vehicle platform and configured to move laterally along a lateral axis, perpendicular to the vertical axis, between the first storage rack and the vehicle platform, the second mobile table positioned on the second side of the vehicle platform and configured to move laterally along the lateral axis between the second storage rack and the vehicle platform, the dual component battery chamber including a stationary component fixed to the electric vehicle and the mobile component is configured to be slideably coupled to the stationary component,
    wherein the mobile component is configured to be released from the stationary component when the electric vehicle is directly on the vehicle platform and lifted via the one or more lifters.

2. The battery exchange station of claim 1, further comprising a plurality of rails, the plurality of rails configured to guide lateral movement of the first mobile table between the vehicle platform and the first storage rack and lateral movement of the second mobile table between the vehicle platform and the second storage rack.

3. The battery exchange station of claim 1, wherein the first mobile table and the second mobile table each comprise a plurality of rollers, the plurality of rollers configured to selectively convey the first battery or the second battery axially with respect to the lateral axis, and wherein the mobile component has open sides arranged axially with respect to the lateral axis.

4. The battery exchange station of claim 3, wherein the mobile component is configured to be lowered from the stationary component into alignment with the first mobile table and the second mobile table, wherein a base of the mobile component is approximately level with a first upper surface of the first mobile table and with a second upper surface of the second mobile table, the alignment forming a conveyor surface from the first mobile table through the open sides of the mobile component to the second mobile table.

5. The battery exchange station of claim 1, wherein the first storage rack comprises a battery lifter, and a first storage unit and a second storage unit arranged on opposing sides of the battery lifter, the first storage unit and the second storage unit comprising a plurality of shelves having an opening facing the battery lifter.

6. The battery exchange station of claim 5, wherein the battery lifter comprises a lift platform slideably coupled to the first storage rack and the second storage rack, and a pair of servomotors coupled to the lift platform, wherein the lift platform has open sides and is vertically translatable via operating the pair of servomotors.

7. A battery exchange station for an electric vehicle, comprising:
    a vehicle platform including one or more lifters;
    a first storage rack positioned on a first side of the vehicle platform and a second storage rack positioned on an opposing, second side of the vehicle platform, the first storage rack and the second storage rack storing a plurality of batteries, wherein the first storage rack comprises a battery lifter, and a first storage unit and a second storage unit arranged on opposing sides of the battery lifter, the first storage unit and the second storage unit comprising a plurality of shelves having an opening facing the battery lifter, wherein the battery lifter comprises a lift platform slideably coupled to the first storage rack and the second storage rack, and a pair of servomotors coupled to the lift platform, wherein the lift platform has open sides and is vertically translatable via operating the pair of servomotors; and
    a battery exchange mechanism comprising a first mobile table and a second mobile table, wherein the lift platform comprises a main lifter and a lifter complement, the lifter complement selectively coupling to the main lifter via a plurality of locks and selectively coupling to the first mobile table.

8. A battery exchange system for an electric vehicle, comprising:
    a vehicle platform including one or more lifters;
    a first storage rack positioned on a first side of the vehicle platform and a second storage rack positioned on an opposing, second side of the vehicle platform, the first storage rack and the second storage rack storing a plurality of batteries, the first storage rack comprising a first storage unit, a second storage unit, and a battery lifter arranged intermediate the first storage unit and the second storage unit, wherein the battery lifter comprises a lift platform and a pair of servomotors coupled to the lift platform, and wherein the lift platform is vertically translatable along a vertical axis via operating the pair of servomotors;

a battery exchange mechanism comprising a first mobile table and a second mobile table each having rollers and a plurality of rails extending from the first storage rack to the vehicle platform in parallel to a lateral axis, the lateral axis perpendicular to the vertical axis, the plurality of rails configured to guide translation of the first mobile table along the lateral axis between the vehicle platform and the first storage rack; and a controller with computer readable instructions stored on non-transitory memory that when executed cause the controller to:

operate the one or more lifters in response to detecting the electric vehicle positioned on the vehicle platform;

operate one or more servomotor and spindle arrangements to release a mobile component from a stationary component of a dual component battery chamber of the electric vehicle, the stationary component fixed to the electric vehicle, the mobile component containing a first battery; and operate the rollers of the first and second mobile tables to position a second battery inside the mobile component while simultaneously positioning the first battery on the second mobile table.

9. The battery exchange system of claim 8, wherein the controller further includes computer readable instructions stored on the non-transitory memory that when executed cause the controller to:

operate the one or more servomotor and spindle arrangements to raise the mobile component and couple the mobile component to the stationary component of the dual component battery chamber, the mobile component containing the second battery.

10. The battery exchange system of claim 8, wherein the controller further includes computer readable instructions stored on the non-transitory memory that when executed cause the controller to:

in response to detecting the electric vehicle exit the vehicle platform, prepare the vehicle platform for a second vehicle, including sliding the first mobile table to the battery lifter, operating the battery lifter to unload a third battery from the first storage rack onto the first mobile table, sliding the second mobile table to a second battery lifter, operating the second battery lifter to load the first battery into the second storage rack, and sliding the first mobile table and the second mobile table to the vehicle platform.

11. The battery exchange system of claim 8, further comprising a second plurality of rails configured to guide translation of the second mobile table between the vehicle platform and the second storage rack.

12. The battery exchange system of claim 8, wherein the first storage unit and the second storage unit each comprise a plurality of shelves having an opening facing the battery lifter.

13. The battery exchange station of claim 1, wherein the first mobile table includes a first set of rollers and a second set of rollers, the first set of rollers configured to move the second battery laterally along the lateral axis and the second set of rollers configured to move the second battery horizontally along a horizontal axis, perpendicular to the lateral axis.

14. The battery exchange system of claim 8, wherein the rollers include a first set of rollers on the first mobile table and a second set of rollers on the second mobile table, and wherein operating the rollers of the first and second mobile tables to position the second battery inside the mobile component while simultaneously positioning the first battery on the second mobile table comprises operating the first set of rollers to move the second battery laterally inside the mobile component while operating the second set of rollers to position the first battery on the second mobile table.

15. The battery exchange system of claim 14, further comprising a third set of rollers on the second mobile table, and further instructions stored on the non-transitory memory of the controller that when executed cause the controller to operate the third set of rollers to move the first battery from the second mobile table to the second storage rack.

* * * * *